(12) United States Patent
Taguchi et al.

(10) Patent No.: US 12,124,251 B2
(45) Date of Patent: Oct. 22, 2024

(54) DATA PROCESSING APPARATUS, METHOD, AND PROGRAM

(71) Applicants: KABUSHIKI KAISHA TOSHIBA, Tokyo (JP); Toshiba Energy Systems & Solutions Corporation, Kawasaki (JP)

(72) Inventors: Yasunori Taguchi, Kawasaki Kanagawa (JP); Kouta Nakata, Tokyo (JP); Susumu Naito, Yokohama Kanagawa (JP); Yuichi Kato, Kawasaki Kanagawa (JP); Shinya Tominaga, Yokohama Kanagawa (JP); Isaku Nagura, Tokyo (JP); Ryota Miyake, Yokohama Kanagawa (JP); Yusuke Terakado, Yokohama Kanagawa (JP); Toshio Aoki, Tokyo (JP)

(73) Assignees: KABUSHIKI KAISHA TOSHIBA, Tokyo (JP); TOSHIBA ENERGY SYSTEMS & SOLUTIONS CORPORATION, Kanagawa (JP)

(*) Notice: Subject to any disclaimer, the term of this patent is extended or adjusted under 35 U.S.C. 154(b) by 6 days.

(21) Appl. No.: 17/942,976

(22) Filed: Sep. 12, 2022

(65) Prior Publication Data
US 2023/0140271 A1    May 4, 2023

(30) Foreign Application Priority Data
Nov. 1, 2021 (JP) .................. 2021-179004

(51) Int. Cl.
G05B 23/02    (2006.01)
G05B 19/418   (2006.01)
G06N 20/00    (2019.01)

(52) U.S. Cl.
CPC ....... *G05B 23/0221* (2013.01); *G05B 19/418* (2013.01); *G06N 20/00* (2019.01)

(58) Field of Classification Search
CPC ... G05B 23/0221; G05B 19/418; G06N 20/00
See application file for complete search history.

(56) References Cited

U.S. PATENT DOCUMENTS

2014/0114888 A1* 4/2014 Noda .................. G06N 20/00
                                                    706/12
2020/0193219 A1* 6/2020 Namiki .................. G06T 7/00
(Continued)

FOREIGN PATENT DOCUMENTS

JP    2007279887 A    10/2007
JP    2021033705 A     3/2021
(Continued)

OTHER PUBLICATIONS

"Detect data drift (preview) on datasets", https://docs.microsoft.com/en-us/azure/machine-learning/how-to-monitor-datas ets?tabs=python, 2021.
(Continued)

*Primary Examiner* — Manuel A Rivera Vargas
(74) *Attorney, Agent, or Firm* — Holtz, Holtz & Volek PC

(57) ABSTRACT

According to one embodiment, a data processing apparatus includes a processor. The processor calculates, from the first measurement data, a first differential value set that is a set of first differential values in a time direction at a time included in the first period of the measurement values of the sensor of interest. The processor calculates, from the second measurement data, a second differential value set that is a set of second differential values in a time direction at a time included in the second period of the measurement values of the sensor of interest. The processor generates a first differ-
(Continued)

ential value distribution and a second differential value distribution using the second differential value set.

17 Claims, 17 Drawing Sheets

(56) References Cited

U.S. PATENT DOCUMENTS

| | | | |
|---|---|---|---|
| 2021/0065023 A1 | 3/2021 | Naito et al. | |
| 2021/0356943 A1 | 11/2021 | Taguchi et al. | |
| 2022/0082625 A1* | 3/2022 | Kurisawa | G06N 20/00 |
| 2022/0137611 A1 | 5/2022 | Naito et al. | |
| 2023/0084342 A1 | 3/2023 | Taguchi et al. | |

FOREIGN PATENT DOCUMENTS

| | | | |
|---|---|---|---|
| JP | 2021179740 A | 11/2021 | |
| JP | 2021189717 A | 12/2021 | |
| JP | 2022074890 | 5/2022 | |
| JP | 2023042945 A | 3/2023 | |

OTHER PUBLICATIONS

Onabuta, "DataDrift in Azure Machine Learning", https://dev.to/konabuta/datadrift-in-azure-machine-learning-51i4, Apr. 19, 2020, 2020.
U.S. Appl. No. 17/680,374, First Named Inventor: Yasunori Taguchi; Title: "Monitoring Apparatus, Method, and Program"; filed Feb. 25, 2022.

\* cited by examiner

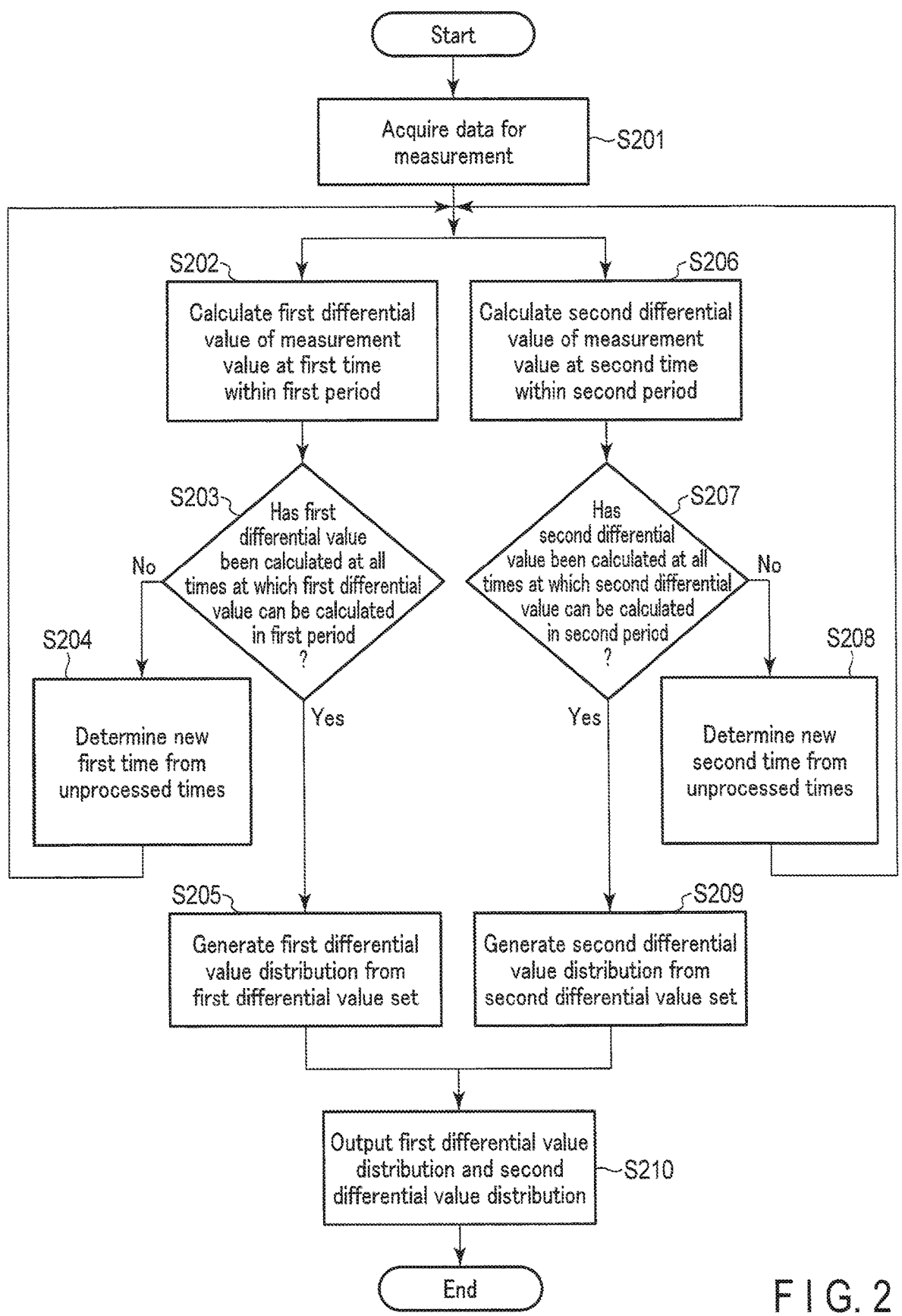
F I G. 2

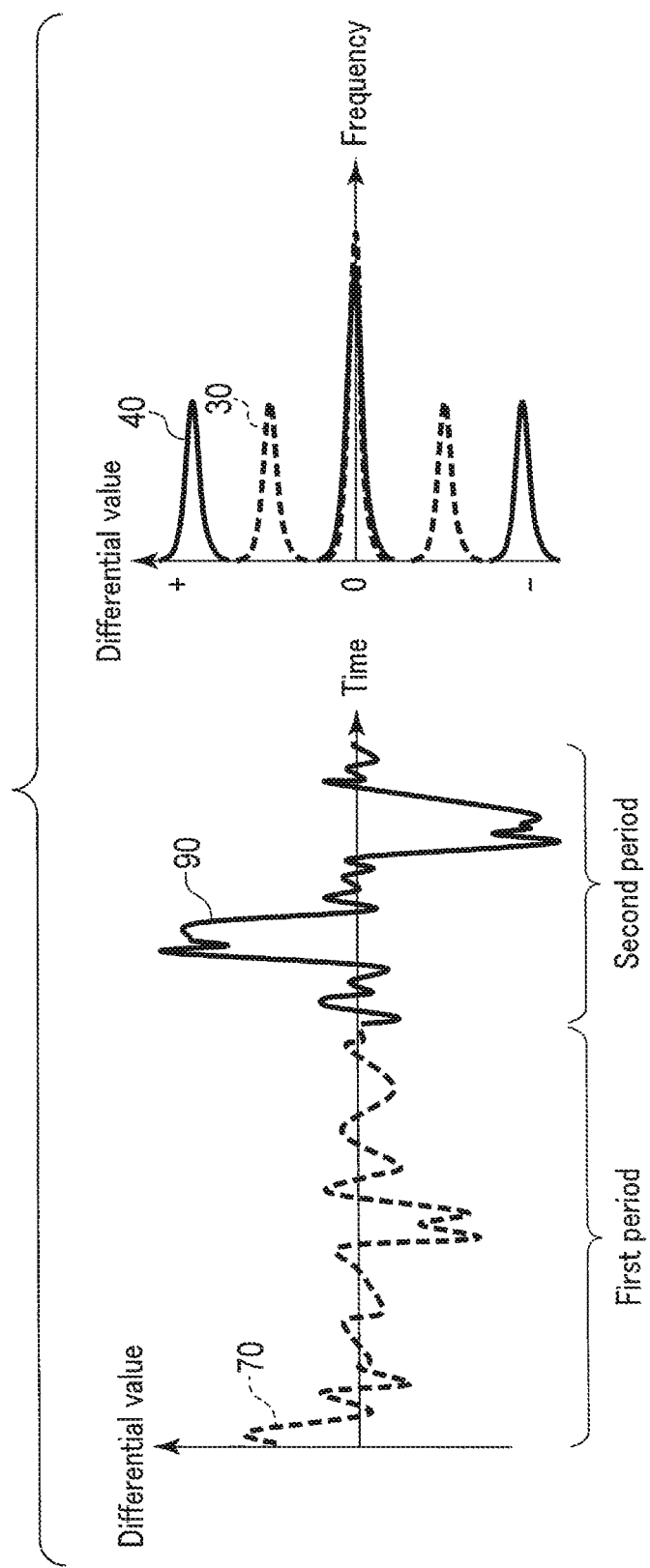
F I G. 12

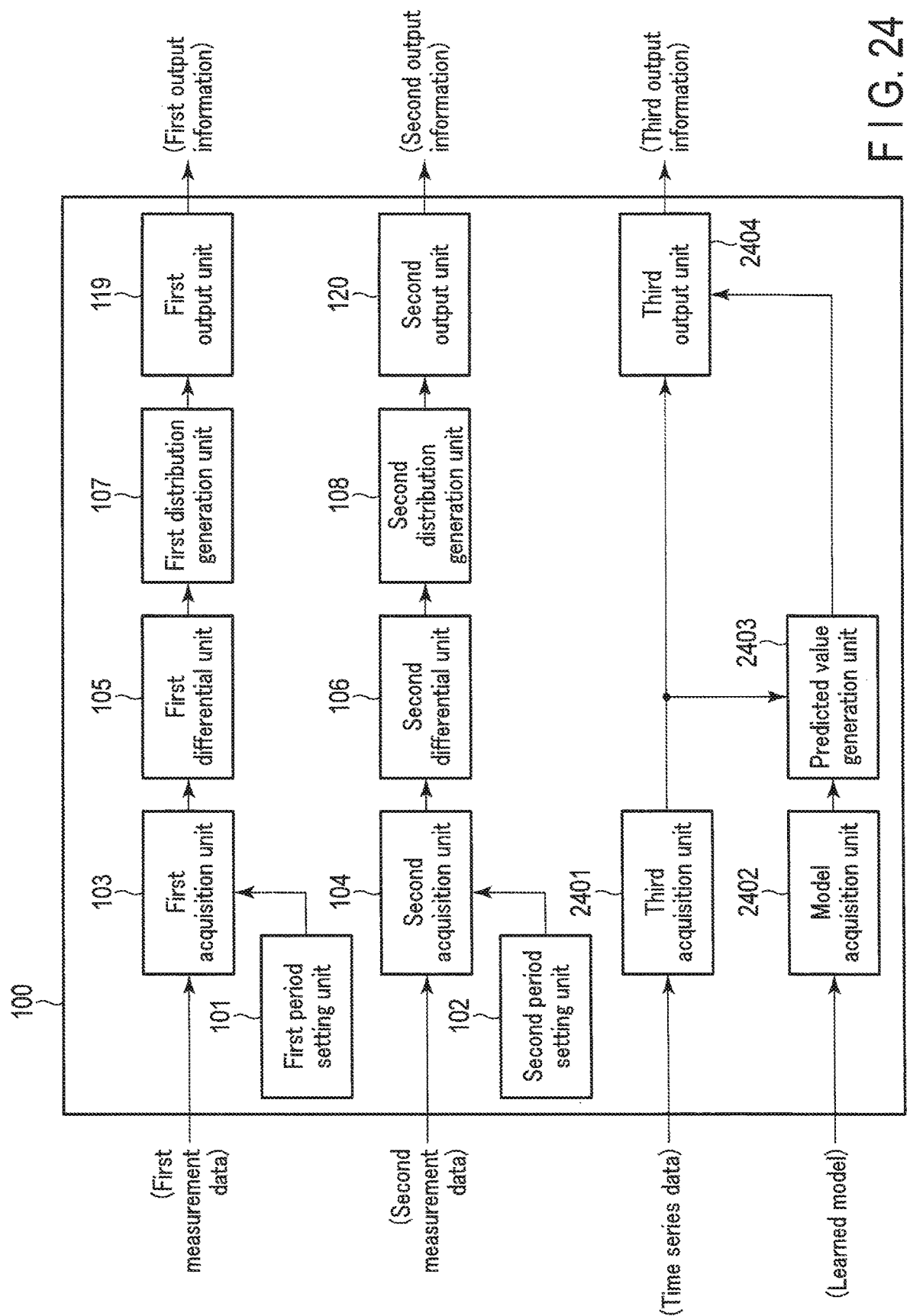
F I G. 24

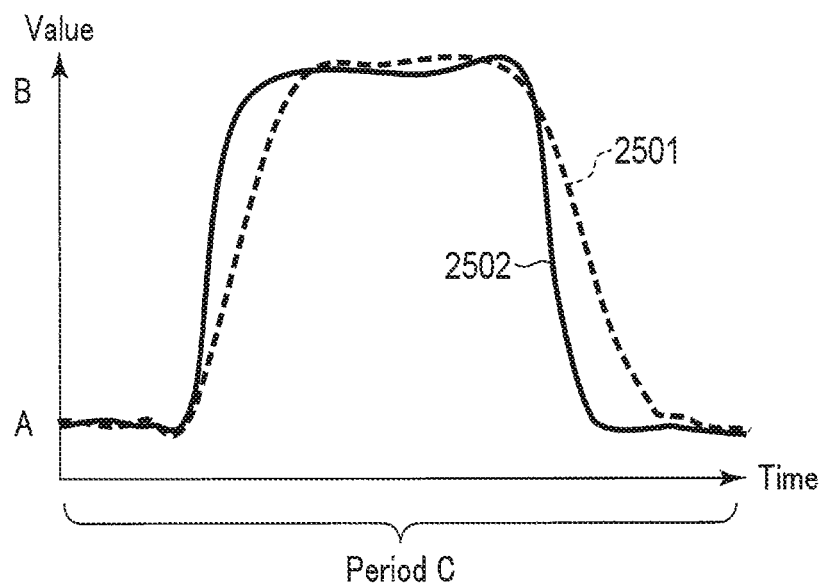
F I G. 25
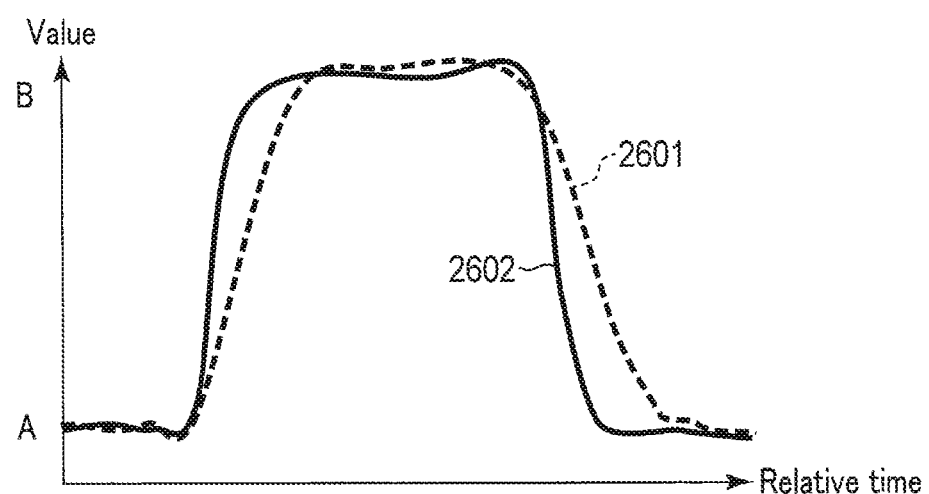
F I G. 26

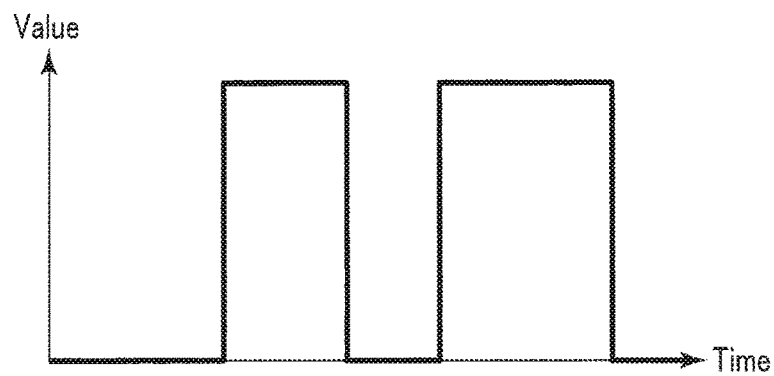
F I G. 28
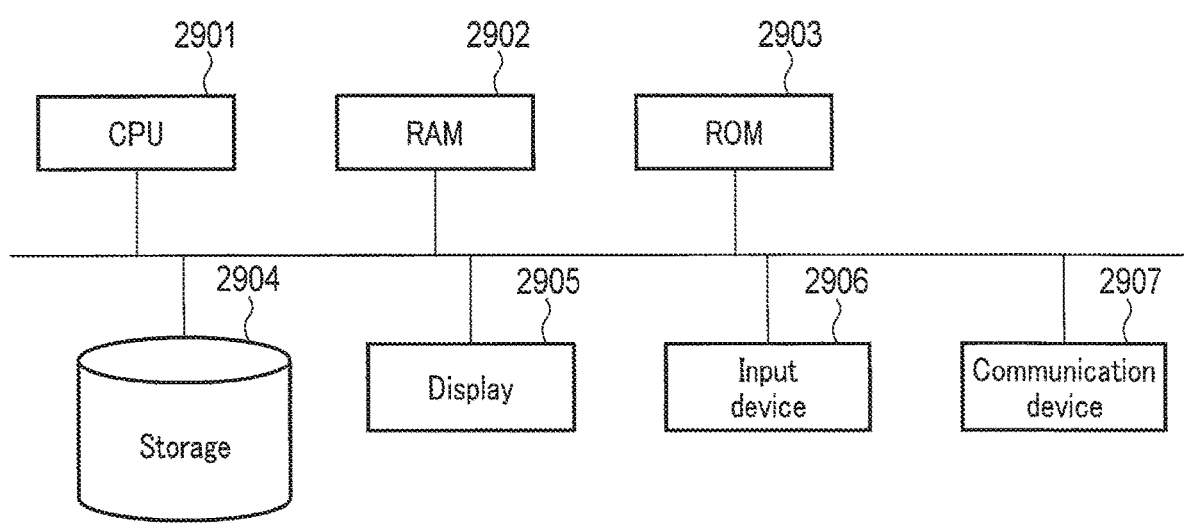
F I G. 29

DATA PROCESSING APPARATUS, METHOD, AND PROGRAM

CROSS-REFERENCE TO RELATED APPLICATIONS

This application is based upon and claims the benefit of priority from Japanese Patent Application No. 2021-179004, filed Nov. 1, 2021, the entire contents of which are incorporated herein by reference.

FIELD

Embodiments described herein relate generally to a data processing apparatus, a method, and a program.

BACKGROUND

A system such as a power plant, a water treatment plant, and a manufacturing apparatus includes a plurality of devices. If the system is a system used for an infrastructure, the stop of the system adversely affects a social function. Further, even if the system is not used for an infrastructure, stoppage of the system causes an economic loss. Accordingly, it is important to keep the system in a healthy state.

Therefore, in many cases, one or more sensors are installed at various places in the system for monitoring the system. The state of the system can be monitored by using the measurement values of the one or more installed sensors. However, if the system is large or complicated, the number of sensors required for monitoring increases. Therefore, it is difficult to monitor all the sensors simultaneously with a limited number of people.

Therefore, a monitoring apparatus that assists or automates monitoring of a system is known. For example, in a case where a deviation between a predicted value obtained by predicting a measured value of a sensor from a machine learning model and an actual measurement value is detected, there is a method of regarding that an anomaly is detected. However, a degree of deterioration of the machine learning model due to a change in environment or data is unknown, and it is difficult to determine the update timing. Furthermore, erroneous detection increases by continuously using the deteriorated machine learning model.

On the other hand, there is also a method of detecting a drift of a sensor measurement value and detecting a drift of a sensor measurement value due to aged deterioration of a measuring instrument. However, since the drift of an instantaneous value called the sensor measurement value is detected, it is not possible to detect a time differential value which is a change amount of the sensor measurement value per predetermined time, that is, the drift with respect to a time derivative, and there is a possibility that erroneous detection is performed even in a case where an operation is normal only because the time derivative is different.

BRIEF DESCRIPTION OF THE DRAWINGS

FIG. 2 is a flowchart illustrating an operation of the data processing apparatus according to the first embodiment.

FIG. 12 is a diagram illustrating a second modification of the display example of the trend graph according to the second embodiment.

FIG. 24 is a block diagram illustrating a data processing apparatus according to a ninth embodiment.

FIG. 25 is a diagram illustrating an example of a trend graph of a measurement value and a predicted value for a certain sensor of interest according to the ninth embodiment.

FIG. 26 is a diagram illustrating an example of a trend graph of a period of training data and a measurement value of a period C for a certain sensor of interest according to the ninth embodiment.

FIG. 28 is a diagram illustrating a display example of a detection signal according to the tenth embodiment.

FIG. 29 is a diagram illustrating an example of a hardware configuration of the data processing apparatus.

DETAILED DESCRIPTION

In general, according to one embodiment, a data processing apparatus includes a processor. The processor acquires first measurement data that is a set of measurement values in a first period among time series data of measurement values of a sensor of interest. The processor acquires second measurement data that is a set of measurement values in a second period different from the first period among the time series data of the measurement values of the sensor of interest. The processor calculates, from the first measurement data, a first differential value set that is a set of first differential values in a time direction at a time included in the first period of the measurement values of the sensor of interest. The processor calculates, from the second measurement data, a second differential value set that is a set of second differential values in a time direction at a time included in the second period of the measurement values of the sensor of interest. The processor generates a first differential value distribution using the first differential value set. The processor generates a second differential value distribution using the second differential value set. The processor outputs the first differential value distribution and the second differential value distribution.

Hereinafter, a data processing apparatus, a method, and a program according to the present embodiments will be described in detail with reference to the drawings. Note that, in the following embodiments, parts denoted by the same reference signs perform the same operation, and redundant description will be appropriately omitted.

First Embodiment

Figure 1:
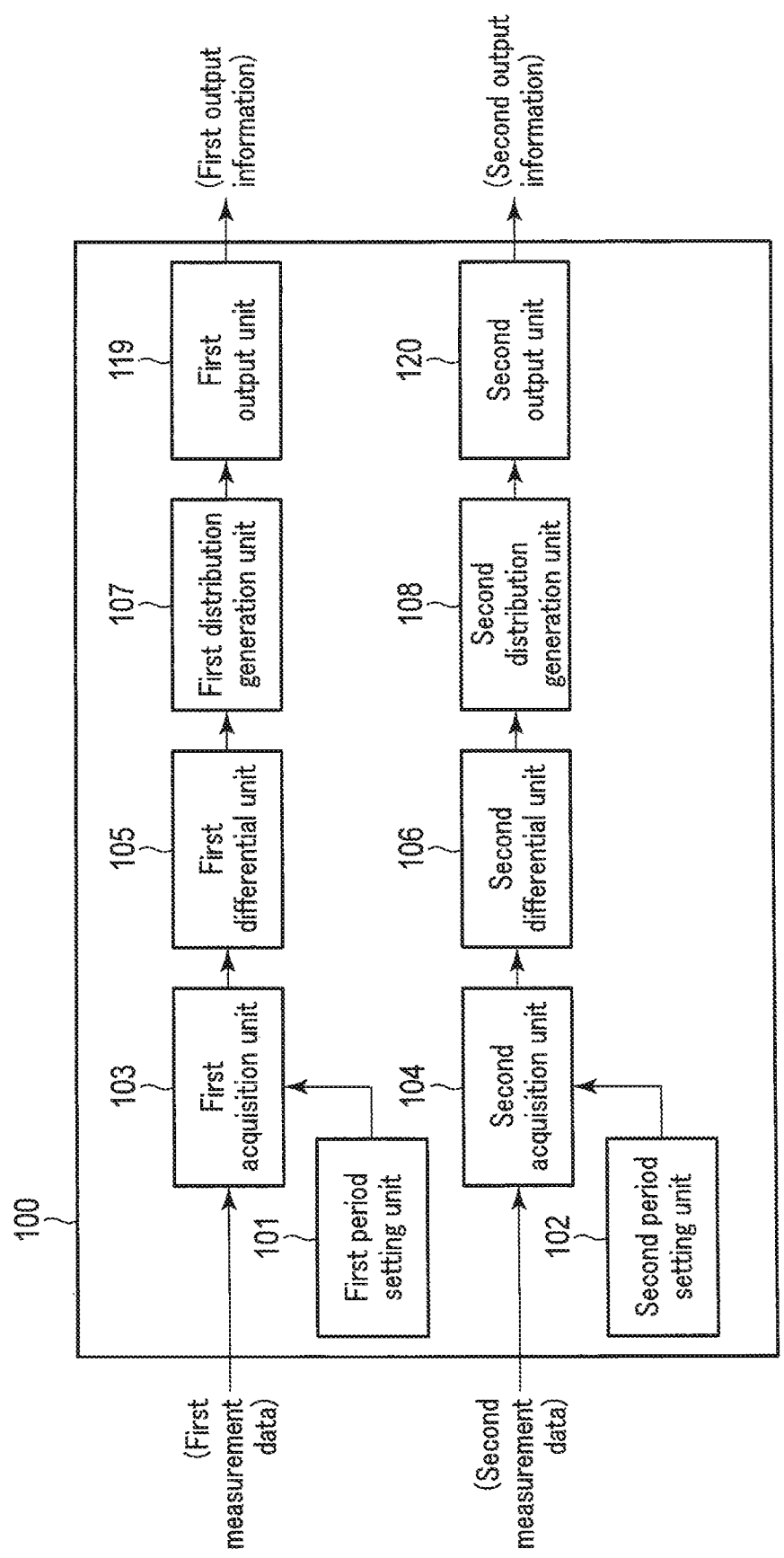
FIG. 1 is a block diagram illustrating a data processing apparatus according to a first embodiment.

FIG. 1 is a block diagram illustrating a data processing apparatus 100 according to a first embodiment. The data processing apparatus 100 includes a first period setting unit 101, a second period setting unit 102, a first acquisition unit 103, a second acquisition unit 104, a first differential unit 105, a second differential unit 106, a first distribution generation unit 107, a second distribution generation unit 108, a first output unit 119, and a second output unit 120.

Note that, in the following description, when contents are common to a first configuration and a second configuration, ordinal numbers are omitted. For example, contents common to the first differential unit 105 and the second differential unit 106 will be described as "the differential unit is".

The first period setting unit 101 sets a predetermined first period, and sends the first predetermined period to the first acquisition unit 103.

The second period setting unit 102 sets a predetermined second period different from the first period, and sends the second period to the second acquisition unit 104.

The first acquisition unit 103 receives information regarding the first period from the first period setting unit 101, and acquires, from the outside, first measurement data that is a set of measurement values in the first period of a sensor of interest that is a sensor of interest among one or more sensors installed in a system. The first acquisition unit 103 sends the first measurement data to the first differential unit 105.

The second acquisition unit 104 receives information regarding the second period from the second period setting unit 102, and acquires, from the outside, second measurement data that is a set of measurement values in the second period of the sensor of interest. The second acquisition unit 104 sends the second measurement data to the second differential unit 106.

Here, the sensors of interest from which the first measurement data and the second measurement data are acquired are the same. The first acquisition unit 103 and the second acquisition unit 104 may be synchronized with each other with respect to information of a sensor of interest for acquiring measurement data, and may acquire the first measurement data and the second measurement data from the same sensor of interest. Alternatively, without synchronization between the first acquisition unit 103 and the second acquisition unit 104, information regarding sensor ID may be assigned to a measurement value, and the first measurement data and the second measurement data may be acquired based on the measurement value of each sensor. Thereafter, for example, after acquiring the first measurement data and the second measurement data, a data control unit (not illustrated) may associate the first measurement data and the second measurement data related to the same sensor of interest, and send the first measurement data to the first differential unit 105 and the second measurement data to the second differential unit 106.

The first differential unit 105 receives the first measurement data from the first acquisition unit 103, and calculates a first differential value in a time direction at a first time included in the first period of the measurement value of the first measurement data. The first differential unit 105 transmits, to the first distribution generation unit 107, a first differential value set that is a set of first differential values calculated by changing the first time in the first period. At this time, all the elements of the first differential value set may be collectively sent to the first distribution generation unit 107, or each element of the first differential value set may be sequentially sent to the first distribution generation unit 107. The first differential value in the time direction at the first time is calculated, for example, by calculating a difference between measurement values at a first attention time near the first time and at a first calculation target time separated from the first attention time by s unit time. "s" represents a value of a differential step, and is, for example, "1".

The first attention time is a time to which attention is paid in order to calculate the first differential value at the first time. The first attention time may or may not coincide with the first time. The first calculation target time is, for example, ahead of the first attention time by s unit time. The first calculation target time may be after the first attention time by s unit time. The first differential value in the time direction of the measurement value of the sensor of interest represents a time derivative near the first time of the measurement value of the sensor of interest.

The second differential unit 106 receives the second measurement data from the second acquisition unit 104, and calculates a second differential value in the time direction at a second time included in the second period of the measurement value of the second measurement data. The second differential unit 106 transmits, to the second distribution generation unit 108, a second differential value set that is a set of second differential values calculated by changing the second time in the second period. At this time, all the elements of the second differential value set may be collectively sent to the second distribution generation unit 108, or each element of the second differential value set may be sequentially sent to the second distribution generation unit 108.

The second differential value in the time direction at the second time is calculated, for example, by calculating a difference between measurement values at a second attention time near the second time and at a second calculation target time separated from the second attention time by s unit time. The second attention time is a time to which attention is paid in order to calculate the second differential value at the second time. The second attention time may or may not coincide with the second time. The second calculation target time is, for example, ahead of the second attention time by s unit time. The second calculation target time may be after the second attention time by s unit time. The second differential value in the time direction of the measurement value of the sensor of interest represents a time derivative near the second time of the measurement value of the sensor of interest.

The first distribution generation unit 107 receives the first differential value set from the first differential unit 105, generates a distribution or a cumulative distribution related to the differential value, and sends the distribution to the first output unit 119 as a first differential value distribution.

The second distribution generation unit 108 receives the second differential value set from the second differential unit 106, generates a distribution or a cumulative distribution related to the differential value, and sends the distribution to the second output unit 120 as a second differential value distribution. Here, each of the first differential value distribution and the second differential value distribution is assumed to be, for example, a histogram, but is not limited thereto, and may be a discrete probability distribution, a probability density function, a cumulative histogram, a discrete cumulative probability distribution, a cumulative probability density function, or the like.

The first output unit 119 receives the first differential value distribution from the first distribution generation unit 107, and outputs first output information regarding the first differential value distribution to the outside of the data processing apparatus 100. Note that, when the first output unit 119 is a display apparatus such as a monitor, the first differential value distribution may be displayed as the first output information.

The second output unit 120 receives the second differential value distribution from the second distribution generation unit 108, and outputs second output information representing the second differential value distribution to the outside of the data processing apparatus 100. Note that, when the second output unit 120 is a display apparatus such as a monitor, similarly to the first output unit 119, the second differential value distribution may be displayed as the second output information.

Next, an operation of the data processing apparatus 100 according to the first embodiment will be described with reference to a flowchart of FIG. 2.

In step S201, the first acquisition unit 103 acquires the first measurement data, and the second acquisition unit 104 acquires the second measurement data.

In step S202, the first differential unit 105 calculates the first differential value of the measurement value at the first time within the first period.

In step S203, the first differential unit 105 determines whether or not the first differential value has been calculated at all times at which the first differential value can be calculated in the first period. In a case where the first differential value has been calculated at all times, the process proceeds to step S205. In a case where there is an unprocessed time, the process proceeds to step S204.

In step S204, the first differential unit 105 determines a new first time from the unprocessed times, returns to step S202, and repeats the same processing.

In step S205, the first distribution generation unit 107 generates the first differential value distribution from the first differential value set obtained in step S203.

In step S206, the second differential unit 106 calculates the second differential value of the measurement value at the second time within the second period.

In step S207, the second differential unit 106 determines whether or not the second differential value has been calculated at all times at which the second differential value can be calculated in the second period. In a case where the second differential value has been calculated at all times, the process proceeds to step S209. In a case where there is an unprocessed time, the process proceeds to step S208.

In step S208, the second differential unit 106 determines a new second time from the unprocessed times, returns to step S206, and repeats the same processing.

In step S209, the second distribution generation unit 108 generates the second differential value distribution from the second differential value set obtained in step S207.

In step S210, the first output unit 119 and the second output unit 120 output the first differential value distribution and the second differential value distribution. The first differential value distribution and the second differential value distribution may be displayed on separate monitors, or may be displayed as different graphs on the same monitor.

Figure 3:
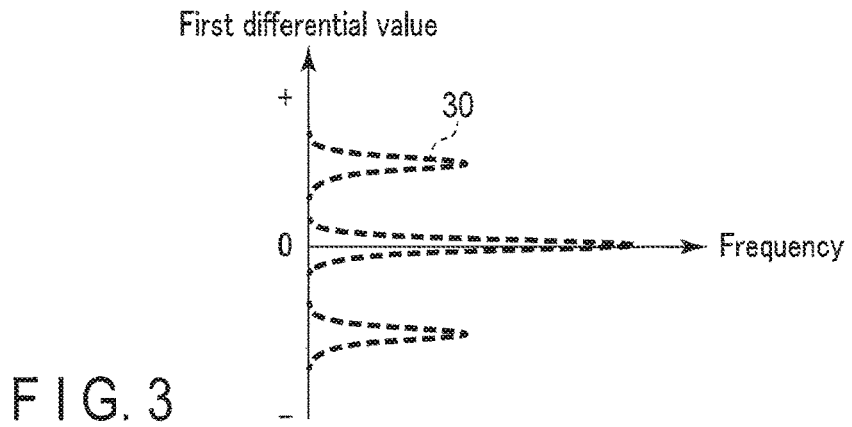
FIG. 3 is a diagram illustrating a display example of a first differential value distribution according to the first embodiment.

Next, a display example of the first differential value distribution is illustrated in FIG. 3.

FIG. 3 is a graph of the first differential value distribution 30, where a horizontal axis represents a frequency and a vertical axis represents the first differential value in the time direction. The first differential value distribution 30 is a histogram of the first differential value in the time direction. Note that the vertical axis and the horizontal axis may be interchanged. As illustrated in FIG. 3, three frequency peaks exist according to the first differential value. That is, when the first differential value is zero, it indicates that the sensor value does not substantially change, and thus the state is a steady state. When the first differential value is positive or negative, it indicates that the time rate of change is positive or negative.

Figure 4:
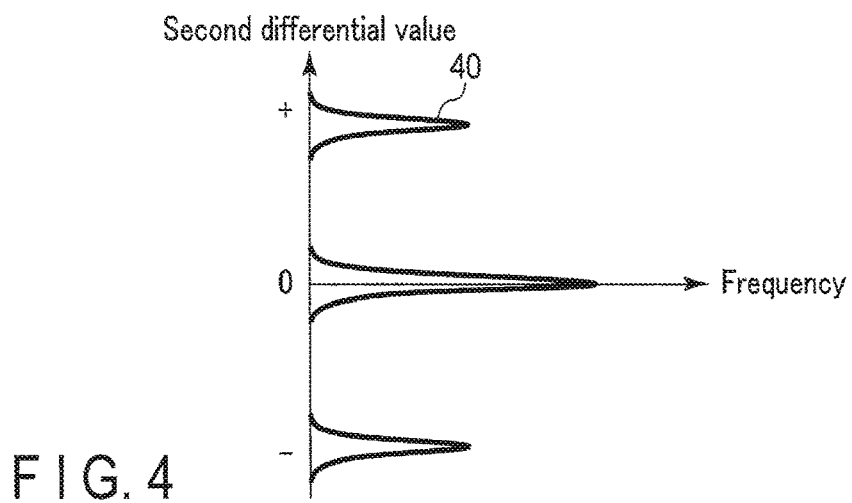
FIG. 4 is a diagram illustrating a display example of a second differential value distribution according to the first embodiment.

Next, a display example of the second differential value distribution is illustrated in FIG. 4.

FIG. 4 is a graph of the second differential value distribution 40, and similarly to FIG. 3, the horizontal axis represents a frequency, and the vertical axis represents the differential value in the time direction. The second differential value distribution 40 is a histogram of the second differential value in the time direction. Note that the vertical axis and the horizontal axis may be interchanged. Similarly to the first differential value distribution, three frequency peaks exist according to the second differential value. Here, it is assumed that an absolute value of the differential value is larger in the second differential value than in the first differential value.

In this case, comparing FIGS. 3 and 4, since the differential value in the time direction is a time derivative, it can be said that an absolute value of the time derivative is larger in the second period than in the first period. When the first differential value distribution matches the second differential value distribution, there is no change between the first period and the second period, that is, no drift occurs at the time derivative. However, a user who compares FIG. 3 with FIG. 4 can understand that the absolute value of the time derivative is different between the first differential value and the second differential value, and thus a drift regarding the time derivative occurs between the first period and the second period.

The drift of the time derivative will be described. For example, it is assumed that a measurement value of a device measured by a sensor changes from 1 to 10 by an operation of an operator. In this case, an amount of change per predetermined time, that is, a rate is different between the case where an operator A changes the measurement value by one step from 1, 2, 3, . . . , 10 and the case where an operator B changes the measurement value from 1 to 10 at once. Therefore, comparing the operations of the operator A and the operator B, it can be said that the time derivative is drifting. Furthermore, regardless of the operator, for example, when closing an open valve installed in the system, if a frictional force, a pressure, and the like around the valve are different between the first period and the second period, the time taken until the valve is closed may be different. In this case, it can be said that the time derivative of a valve opening degree indicating how much the valve is opened is drifting.

Note that the first differential value distribution 30 and the second differential value distribution 40 may be displayed as one graph.

Figure 5:
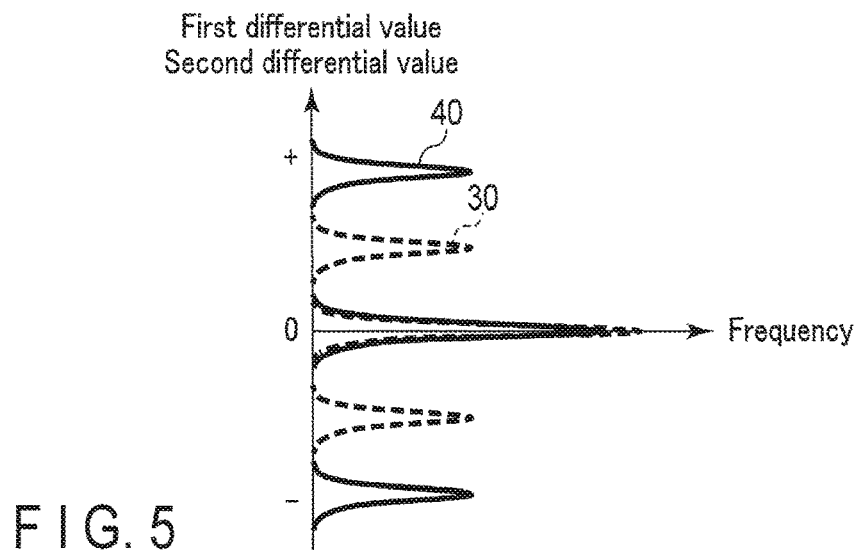
FIG. 5 is a diagram illustrating a modification of a display example of the first differential value distribution and the second differential value distribution.

FIG. 5 illustrates a modification of a display example of the first differential value distribution and the second differential value distribution.

As illustrated in FIG. 5, by superimposing and displaying the first differential value distribution 30 and the second differential value distribution 40, it is possible to easily grasp a difference between peaks of differential values.

Furthermore, in the above example, a case where the differential step is "1" has been assumed, but it is not limited thereto, and for example, the differential step may be designated by the user.

A case where the user designates the differential step will be described with reference to FIG. 6.

Figure 6:
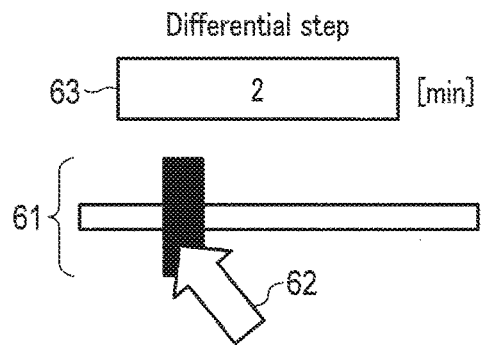
FIG. 6 is a conceptual diagram illustrating a case where a user designates a differential step.

FIG. 6 illustrates an example of a graphical user interface (GUI) for adjusting the differential step. A slider 61 for determining the differential step is set. The user adjusts the differential step, for example, by moving a knob of the slider 61 with a mouse cursor 62 or a finger. The adjusted value is displayed in a text box 63.

Note that the user may directly input a value of the differential step to the text box 63 instead of setting the differential step by the slider 61.

The value input by the user may be given to the first differential unit 105 and the second differential unit 106, and set as the value of the differential step.

Note that the differential step may be determined based on a machine learning model to be applied to the measurement value of the sensor, which determines whether or not an anomaly has occurred in the system by the sensor. Specifically, a time window length may be set to a value smaller than the time window length of input time series data to a trained machine learning model (also referred to as a trained model). For example, when unit time corresponding to the time window length of the machine learning is W, the differential step may be set to a value of "W−1" obtained by subtracting one unit time from "W", or may be set to a value of 1 or more and less than "W". By setting the differential step in this manner, the drift of the time derivative can be similarly calculated.

Note that, when the differential step is set by the user, a lower limit of the value that can be set as the differential step may be set to 1, and an upper limit may be set to "W−1".

According to the first embodiment described above, the first differential value distribution related to the measurement value of the sensor of interest in the first period and the second differential value distribution related to the measurement value of the sensor of interest in the second period are generated. As a result, the user can easily compare the time derivatives, and it is possible to easily detect that the drift regarding the time derivative has occurred. Further, in a case where the drift related to the time derivative occurs, the user can determine whether or not detection of the system in which the sensor of interest is installed is appropriate. As a result, usability can be improved.

Second Embodiment

In a second embodiment, in addition to displaying the first differential value distribution and the second differential value distribution, a trend graph of the first differential value and a trend graph of the second differential value are displayed.

The trend graph of the differential value is a graph representing a temporal change (temporal transition) of the differential value.

The first output unit 119 receives the first differential value set from the first differential unit 105, and further outputs a trend graph of the first differential value as the first output information. Similarly, the second output unit 120 receives the second differential value set from the second differential unit 106, and further outputs a trend graph of the second differential value as the second output information.

Figure 7:
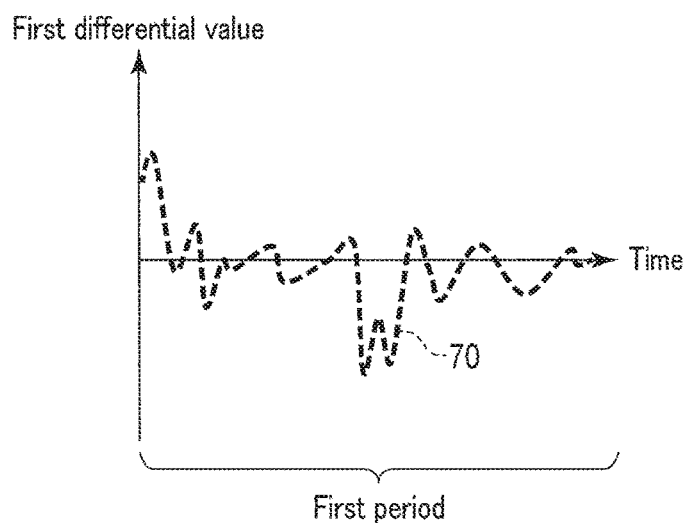
FIG. 7 is a diagram illustrating a display example of a trend graph based on first output information according to a second embodiment.
Figure 8:
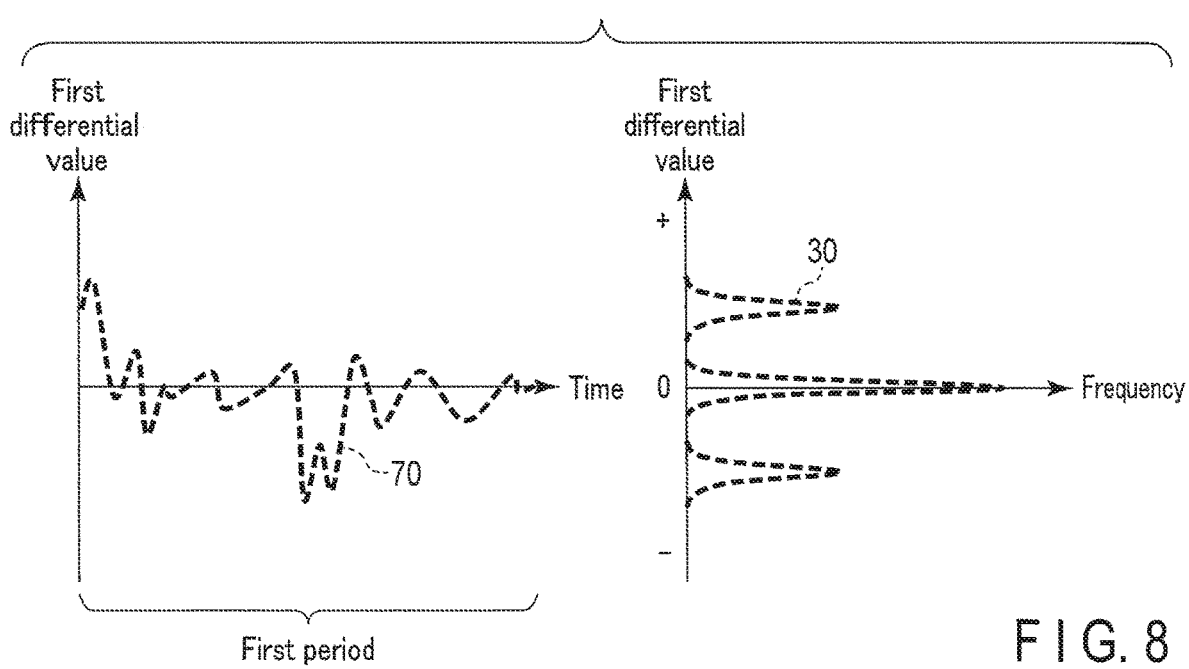
FIG. 8 is a diagram illustrating a display example of a trend graph based on the first output information according to the second embodiment.

FIGS. 7 and 8 illustrate an example of the trend graph output from the first output unit 119 according to the second embodiment.

In FIG. 7, a trend graph 70 in the first period is displayed. A vertical axis represents the first differential value, and a horizontal axis represents time. As a result, a change in the first differential value can be grasped along time series.

The trend graph 70 and the first differential value distribution 30 may be displayed in different display regions, or as illustrated in FIG. 8, the trend graph 70 of the first differential value and the first differential value distribution 30 may be displayed side by side in one display region. When the trend graph 70 and the first differential value distribution 30 are displayed side by side in one display region, it is easier for the user to see by aligning scales of common axes.

Figure 9:
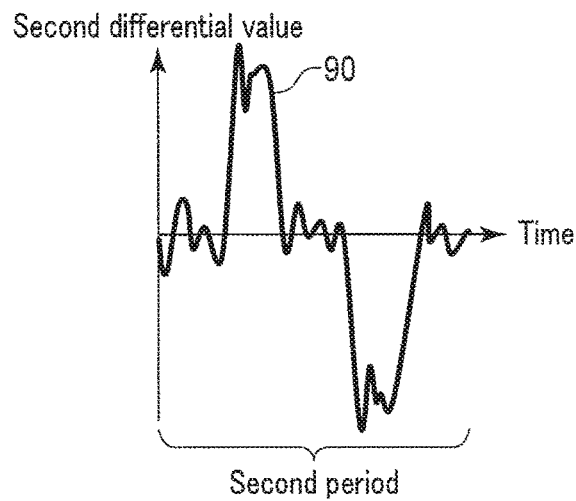
FIG. 9 is a diagram illustrating a display example of a trend graph based on second output information according to the second embodiment.
Figure 10:
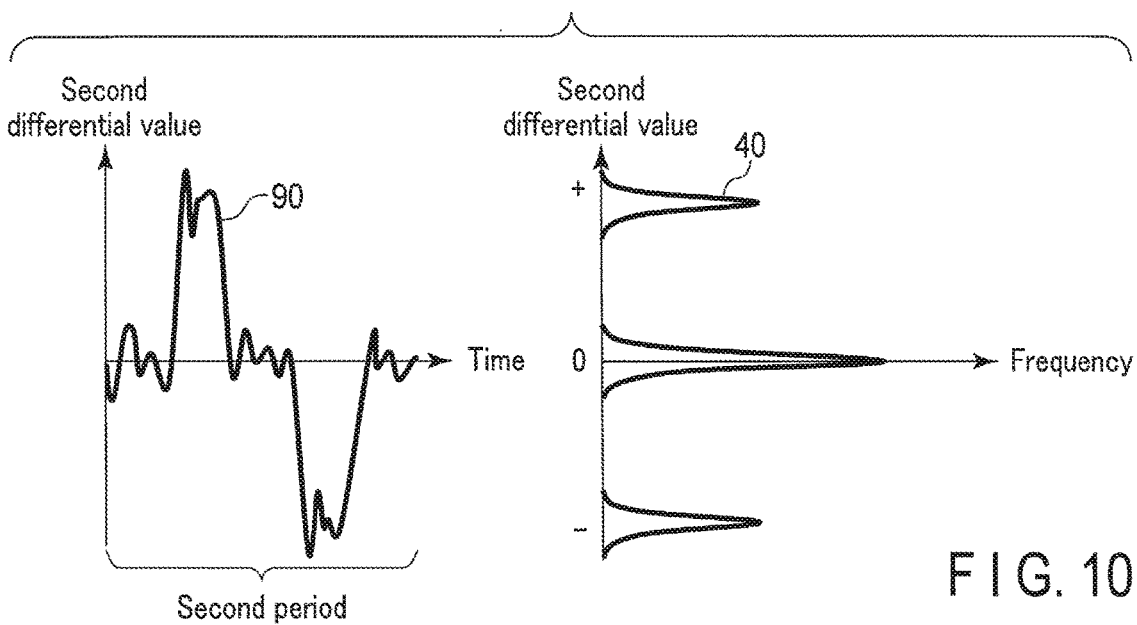
FIG. 10 is a diagram illustrating a display example of a trend graph based on the second output information according to the second embodiment.

Next, an example of the trend graph output from the second output unit 120 according to the second embodiment is illustrated in FIGS. 9 and 10.

In FIG. 9, a trend graph 90 in the second period is displayed. A vertical axis represents the second differential value, and a horizontal axis represents time. As a result, a change in the second differential value can be grasped along time series.

As illustrated in FIG. 10, the trend graph 90 of the second differential value and the second differential value distribution 40 may be displayed side by side.

Figure 11:
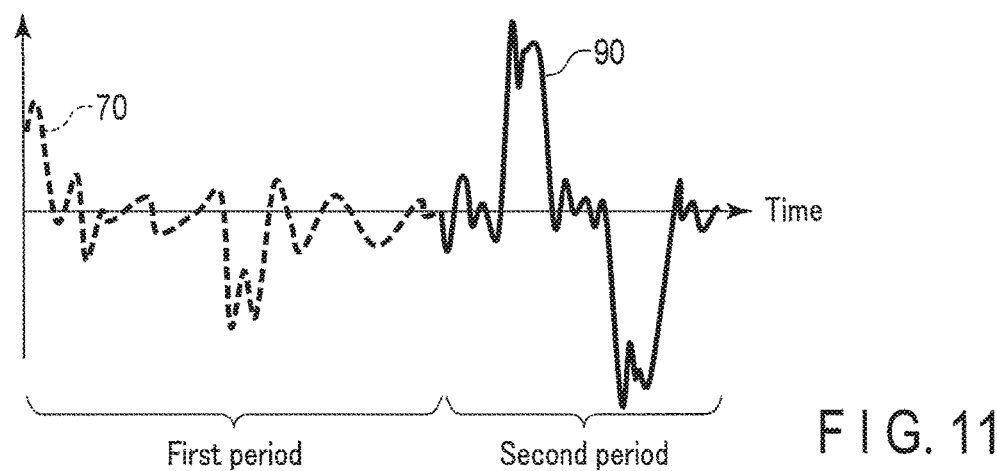
FIG. 11 is a diagram illustrating a first modification of the display example of the trend graph according to the second embodiment.

Next, FIG. 11 illustrates a first modification of a display example of the trend graph.

As illustrated in FIG. 11, a trend graph 70 of the first differential value and a trend graph 90 of the second differential value may be displayed in one graph. By displaying the two trend graphs in one graph, it is possible to grasp the trend of the first differential value and the second differential value along time series.

Next, FIG. 12 illustrates a second modification of a display example of the trend graph.

FIG. 12 is an example in which both the trend graph illustrated in FIG. 11 and the differential value distribution illustrated in FIG. 5 are displayed in the same display area. Note that the trend graph illustrated in FIG. 11 and any one of the graphs in FIGS. 3 and 4 may be displayed on one screen.

According to the second embodiment described above, in addition to displaying the first differential value distribution and the second differential value distribution, the trend graph of the first differential value and the second differential value is generated and output. As a result, it is possible to detect that the drift of the time derivative has occurred, and in addition, it is easy to notice the time when the drift of the time derivative has occurred, so that it is easy to specify the time when the drift has occurred.

Third Embodiment

In a third embodiment, a score for determining the drift of the time derivative is calculated.

A data processing apparatus 100 according to the third embodiment will be described with reference to a block diagram of FIG. 13.

Figure 13:
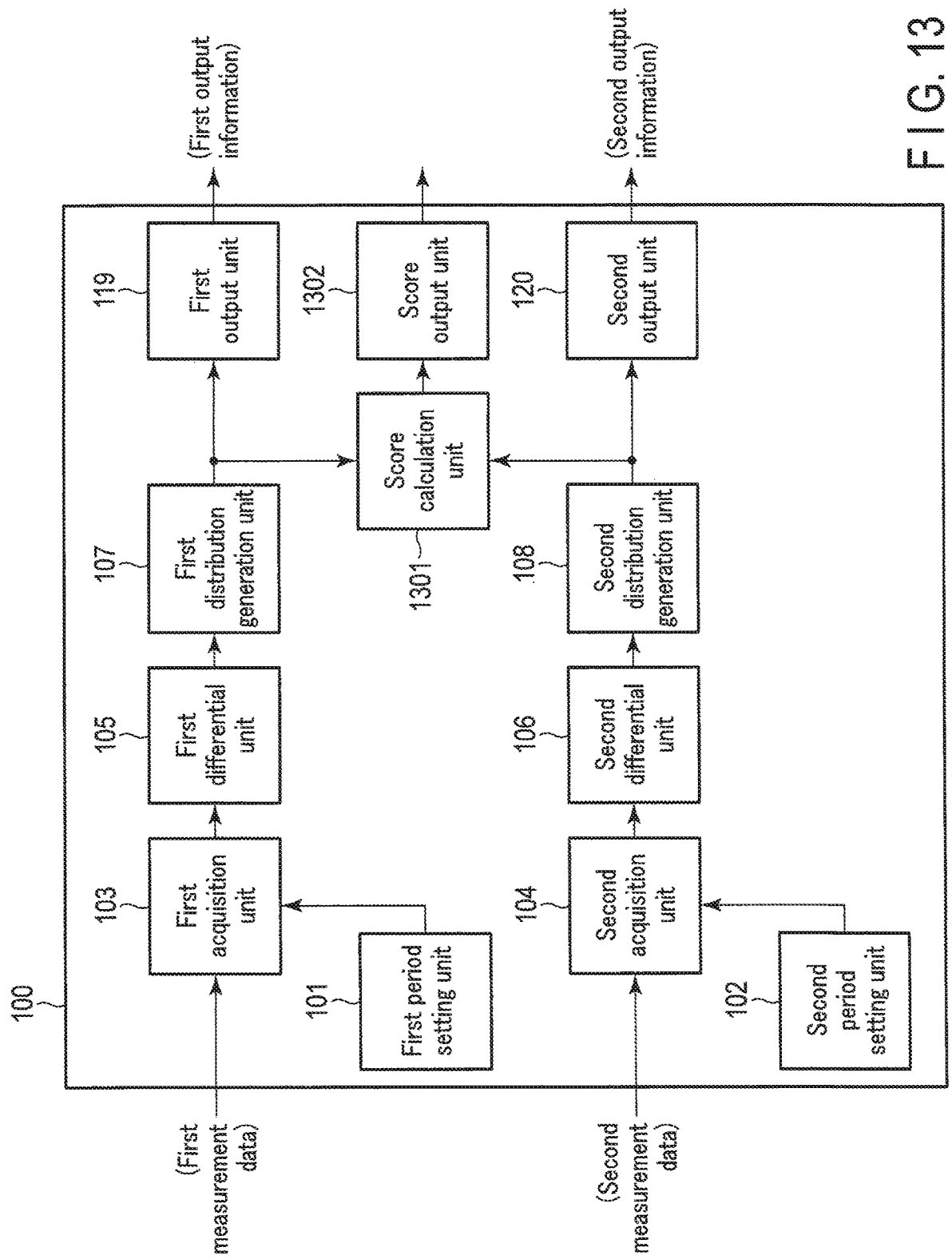
FIG. 13 is a block diagram illustrating a data processing apparatus according to a third embodiment.

The data processing apparatus 100 according to the third embodiment illustrated in FIG. 13 further includes a score calculation unit 1301 and a score output unit 1302 as compared with FIG. 1.

The score calculation unit 1301 receives the first differential value distribution from a first distribution generation unit 107 and the second differential value distribution from a second distribution generation unit 108, and calculates a score regarding a distribution difference. As the score, for example, similarity or dissimilarity between the first differential value distribution and the second differential value distribution may be used. As the similarity, for example, a histogram intersection and a cosine similarity may be used. The dissimilarity may be, for example, Kullback-Leibler divergence or Wasserstein distance, or may be a Euclidean distance, a difference between the maximum values, a difference between the minimum values, a difference between average values, a difference between median values, or a weighted sum of these criteria.

The score output unit 1302 receives the score from the score calculation unit 1301, and outputs the score to the outside. If the score output unit 1302 is a display unit, the score is displayed.

According to the third embodiment described above, the score of the sensor of interest can be known by calculating the score. In a case where the score is the degree of similarity, a smaller value of the score indicates a lower degree of similarity, so that the user can grasp that there is a high possibility that a drift regarding the time derivative of the sensor of interest has occurred. In a case where the score is the degree of dissimilarity, the greater the value of the score, the greater the degree of dissimilarity, so that the user can grasp that there is a high possibility that a drift regarding the time derivative of the sensor of interest has occurred.

Fourth Embodiment

In a fourth embodiment, the occurrence of the drift of the time derivative is detected based on the score.

A data processing apparatus 100 according to the fourth embodiment will be described with reference to a block diagram of FIG. 14.

Figure 14:
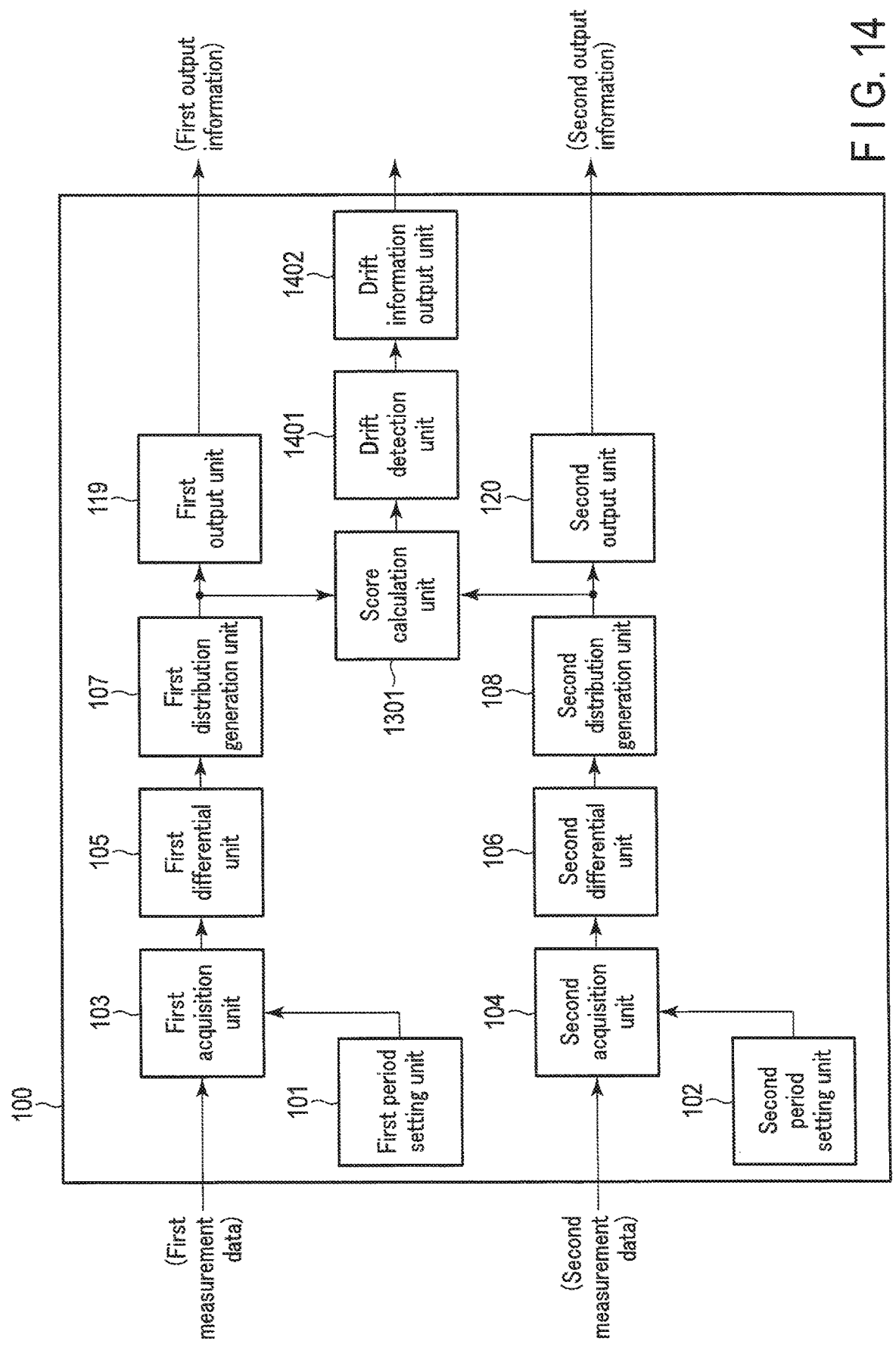
FIG. 14 is a block diagram illustrating a data processing apparatus according to a fourth embodiment.

As compared with FIG. 1, the data processing apparatus 100 according to the fourth embodiment illustrated in FIG. 14 further includes a score calculation unit 1301, a drift detection unit 1401, and a drift information output unit 1402.

The score calculation unit 1301 is similar to that of the third embodiment.

The drift detection unit 1401 receives the score from the score calculation unit 1301, and detects whether or not the drift of the time derivative has occurred by determining a magnitude between the score and a threshold value. In a case where the score is the similarity, when the score is smaller than the threshold value, it is regarded that the drift of the time derivative has occurred and detected. In a case where the score is the degree of dissimilarity, in a case where the score is larger than the threshold value, it is regarded that the drift of the time derivative has occurred, and detection is performed. The drift detection unit 1401 generates a drift detection signal indicating whether the drift of the time derivative of the sensor of interest has been detected.

The drift information output unit 1402 receives the drift detection signal from the drift detection unit 1401, and outputs drift information regarding detection of the drift of the time derivative of the sensor of interest to the outside of the data processing apparatus 100. As the drift information, for example, whether or not the drift of the time derivative of the sensor of interest has occurred in a certain display region on a monitor may be displayed as a text. Alternatively, a sound or an alert sound indicating that the drift of the time derivative has occurred may be output.

According to the fourth embodiment described above, the drift detection unit detects whether or not the drift of the time derivative has occurred based on the score, whereby the user can know whether or not the drift related to the time derivative of the sensor of interest has occurred.

Fifth Embodiment

In a fifth embodiment, it is detected whether or not the drift of the time derivative has occurred in a plurality of the sensors.

A data processing apparatus 100 according to the fifth embodiment may have the same configuration as the data processing apparatus 100 according to the fourth embodiment.

In a case where a plurality of sensors are installed in a certain system, the data processing apparatus 100 may execute the processing according to the fourth embodiment using one of the plurality of sensors as a sensor of interest. When detection processing of a drift of the time derivative for one sensor of interest is completed, in the data processing apparatus 100, for example, a first acquisition unit 103 or a second acquisition unit 104 sets an unprocessed sensor among the plurality of sensors as a new sensor of interest, and acquires the first measurement data and the second measurement data. Similarly, the detection processing of the drift of the time derivative may be executed. Note that, when acquiring the first measurement data and the second measurement data, the first acquisition unit 103 and the second acquisition unit 104 acquire the first measurement data and the second measurement data in association with ID (also referred to as a sensor ID) for uniquely identifying the sensor.

A drift detection unit 1401 may send the drift detection signal related to the drift of the time derivative calculated for the sensor of interest to a drift information output unit 1402 each time the drift detection signal is generated, or may calculate the drift detection signals for all the plurality of sensors and then collectively send the plurality of drift detection signals to the drift information output unit 1402.

The drift information output unit 1402 receives the drift detection signal calculated for each sensor from the drift detection unit 1401, generates a list of sensors in which the drift of the time derivative is detected, and outputs the list to the outside as drift information.

Note that, as the drift information, the number of sensors in which the drift of the time derivative is detected may be output. The drift information output unit 1402 may count the number of sensors in which the drift of the time derivative is detected based on the drift detection signal, and output the number of the sensors to the outside.

According to the fifth embodiment described above, the drift information output unit outputs at least one of the list of the sensors in which the drift of the time derivative has occurred and the number of the sensors among the plurality of sensors. As a result, the user can easily grasp the sensor in which the drift of the time derivative is detected and the number of the sensors.

Sixth Embodiment

In a sixth embodiment, a maximum value, a minimum value, an average value, and a median value of the measurement data in the first period and the second period may be displayed on the graph of the first differential value distribution and the second differential value distribution. In order to simplify the description, an example of displaying the maximum value and the minimum value among the maximum value, the minimum value, the average value, and the median value will be described below.

A configuration of a data processing apparatus 100 according to the sixth embodiment is similar to that of the above-described embodiments.

A first differential unit 105 calculates the maximum value and the minimum value of the first measurement data.

A first output unit 119 receives the maximum value and the minimum value from the first differential unit 105, and outputs the first differential value distribution, and the maximum value and the minimum value as first output information. As a result, the display unit of an output destination or the like can visualize the first differential value distribution while superimposing the maximum value and the minimum value of the first differential value on the first differential value distribution.

Similarly, a second differential unit 106 calculates the maximum value and the minimum value of the second measurement data.

A second output unit 120 receives the maximum value and the minimum value from the second differential unit 106, and outputs the second differential value distribution, and the maximum value and the minimum value as second output information. As a result, the display unit of the output destination or the like can visualize the second differential value distribution while superimposing the maximum value and the minimum value of the second differential value on the second differential value distribution.

Note that the first differential unit 105 and the second differential unit 106 are not limited to calculating the maximum value and the minimum value, respectively. For example, the first output unit 119 may receive the first measurement data from the first differential unit 105, and calculate the maximum value and the minimum value of the first measurement data. Similarly, the second output unit 120 may receive the second measurement data from the second differential unit 106, and calculate the maximum value and the minimum value of the second measurement data.

Figure 15:
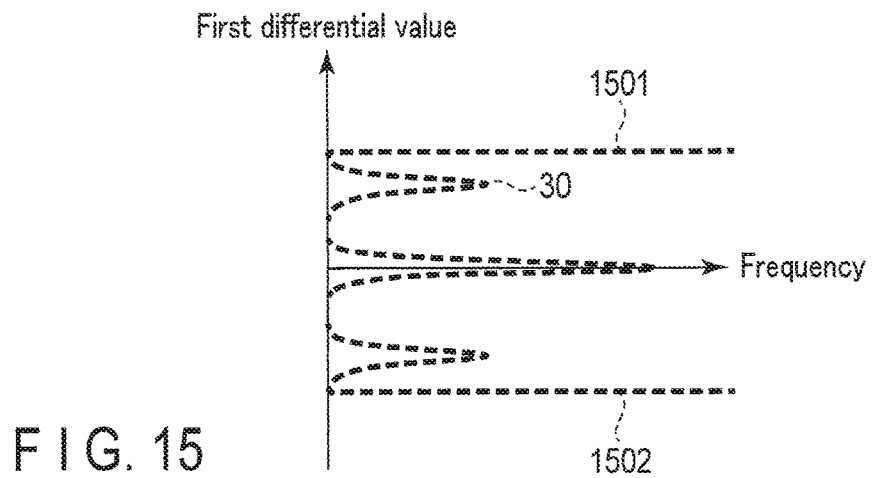
FIG. 15 is a diagram illustrating a first display example of first output information according to a sixth embodiment.

Next, a first display example of the first output information according to the sixth embodiment is illustrated in FIG. 15.

FIG. 15 illustrates an example in which a maximum value 1501 and a minimum value 1502 of the first measurement data are indicated by broken lines in the first differential value distribution 30 illustrated in FIG. 3.

Since the maximum value and the minimum value of the measurement data are important in confirming the drift of the time derivative, it is possible to make it easy for the user to visually recognize the maximum value and the minimum value.

Note that the maximum value and the minimum value of the second measurement data may be displayed in the first differential value distribution.

Figure 16:
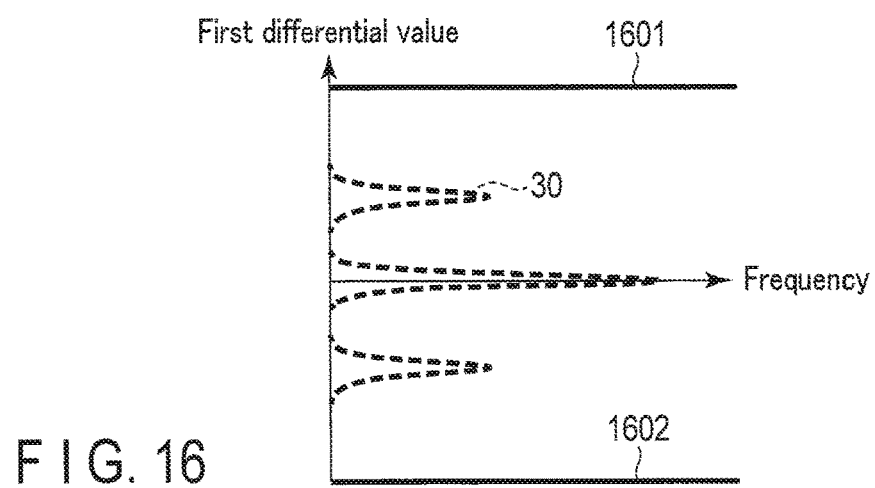
FIG. 16 is a diagram illustrating a second display example of the first output information according to the sixth embodiment.

A second display example of the first output information according to the sixth embodiment is illustrated in FIG. 16.

FIG. 16 illustrates an example in which a maximum value 1601 and a minimum value 1602 of the second measurement data are displayed by solid lines in the first differential value distribution 30 illustrated in FIG. 3. As in the case of FIG. 15, it is possible to allow the user to easily visually recognize the maximum value and the minimum value.

In this case, the first output unit 119 may acquire the maximum value and the minimum value of the second measurement data from the second differential unit 106. Alternatively, the second measurement data may be received from the second differential unit 106, and the first output unit 119 may calculate the maximum value and the minimum value of the second measurement data.

Figure 17:
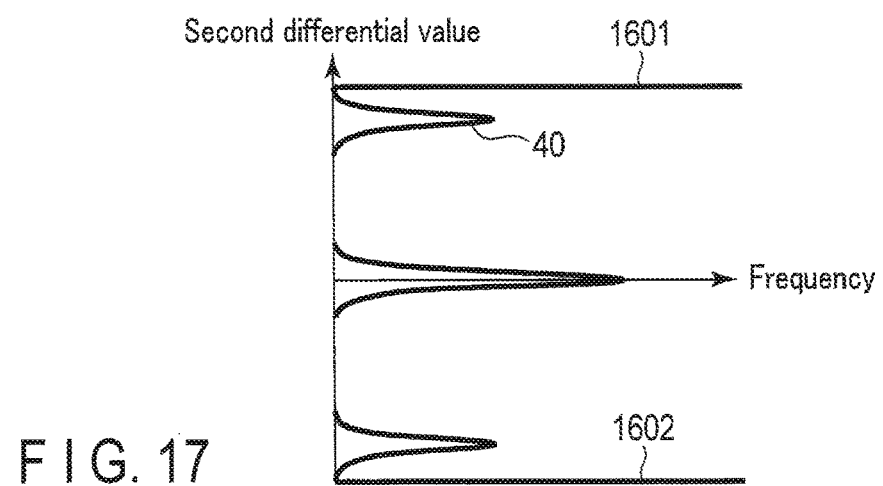
FIG. 17 is a diagram illustrating a first display example of second output information according to the sixth embodiment.

Next, a first display example of the second output information according to the sixth embodiment is illustrated in FIG. 17.

FIG. 17 illustrates an example in which a maximum value 1601 and a minimum value 1602 of the second measurement data are displayed by solid lines in the second differential value distribution 40 illustrated in FIG. 4.

Note that the maximum value and the minimum value of the first measurement data may be displayed in the second differential value distribution.

Figure 18:
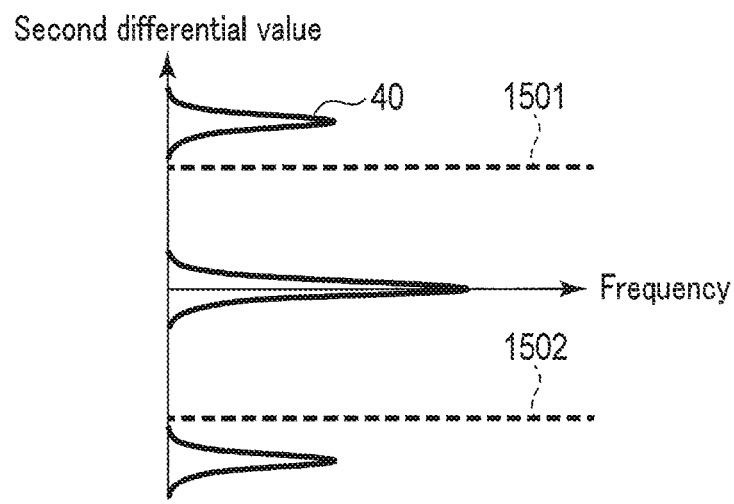
FIG. 18 is a diagram illustrating a second display example of the second output information according to the sixth embodiment.

A second display example of the second output information according to the sixth embodiment is illustrated in FIG. 18.

FIG. 18 illustrates an example in which a maximum value 1501 and a minimum value 1502 of the first measurement data are indicated by broken lines in the second differential value distribution 40 illustrated in FIG. 4. As in the case of FIG. 17, it is possible to allow the user to easily visually recognize the maximum value and the minimum value.

In this case, the second output unit 120 may acquire the maximum value and the minimum value of the first measurement data from the first differential unit 105. Alternatively, the first measurement data may be received from the first differential unit 105, and the second output unit 120 may calculate the maximum value and the minimum value of the first measurement data.

Figure 19:
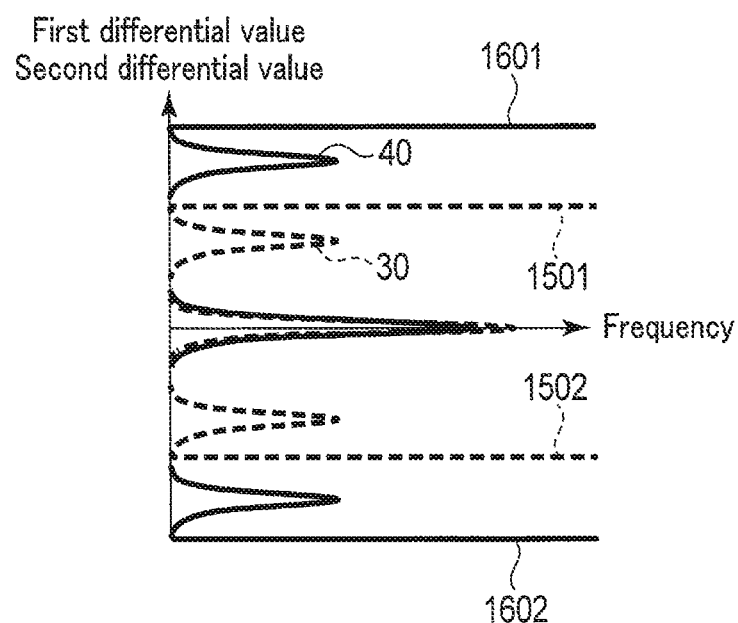
FIG. 19 is a diagram illustrating a third display example of the first output information and the second output information according to the sixth embodiment.

Next, a third display example of the first output information and the second output information according to the sixth embodiment is illustrated in FIG. 19.

FIG. 19 is a graph in which a first differential value distribution 30, a second differential value distribution 40, a maximum value 1501 and a minimum value 1502 of the first measurement data, and a maximum value 1601 and a minimum value 1602 of the second measurement data are displayed in a superimposed manner.

For example, if the drift of the time derivative does not occur, it is assumed that the maximum value 1501 and the maximum value 1601 are close to each other, but since the maximum value 1501 and the maximum value 1601 are separated as illustrated in FIG. 19, it is possible to grasp a possibility that the drift of the time derivative occurs. Of course, in the comparison between the minimum value 1502 and the minimum value 1602, it is possible to similarly grasp a possibility that the drift of the time derivative occurs.

According to the sixth embodiment described above, the maximum value and the minimum value of the measurement data that cannot be confirmed only by the histogram or the probability density function of the differential value distribution are calculated and superimposed and displayed on the graph, so that the user can easily confirm the maximum value and the minimum value.

Seventh Embodiment

In a seventh embodiment, a scatter diagram is created and output based on the differential value.

A data processing apparatus according to the seventh embodiment will be described with reference to FIG. 20.

Figure 20:
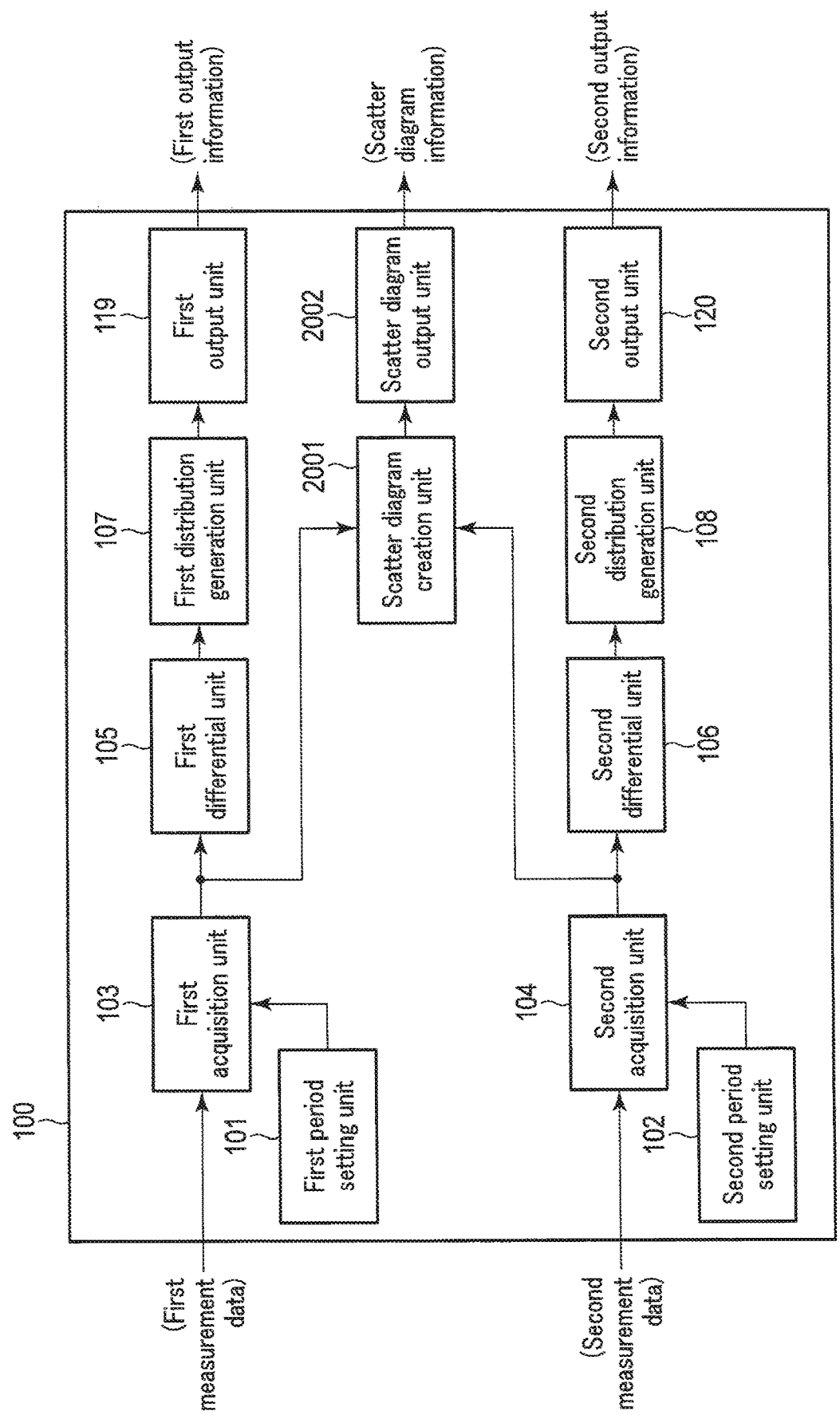
FIG. 20 is a block diagram illustrating a data processing apparatus according to a seventh embodiment.

As compared with FIG. 1, a data processing apparatus 100 according to the seventh embodiment illustrated in FIG. 20 further includes a scatter diagram creation unit 2001 and a scatter diagram output unit 2002.

The scatter diagram creation unit 2001 receives the first measurement data from a first acquisition unit 103 and the second measurement data from a second acquisition unit 104, and creates scatter diagram data of the first measurement data and the second measurement data.

The scatter diagram output unit 2002 outputs scatter diagram data from the scatter diagram creation unit 2001 to the outside.

Next, a first display example of the scatter diagram data created by the scatter diagram creation unit according to the seventh embodiment will be described with reference to FIG. 21.

Figure 21:
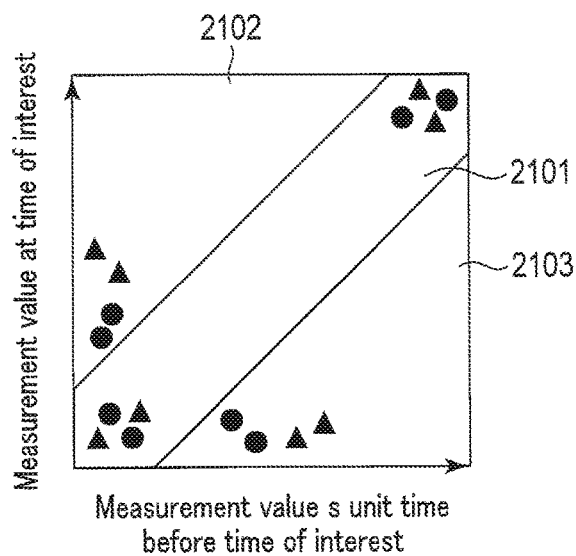
FIG. 21 is a diagram illustrating a first display example of scatter diagram data according to the seventh embodiment.

In a scatter diagram illustrated in FIG. 21, a vertical axis represents the measurement value at a time of interest, and a horizontal axis represents the measurement value at a time that is s unit time before the time of interest.

A time of interest is set from among a plurality of times corresponding to measurement values included in measurement data, and a time of a combination of a measurement value at the time of interest and a measurement value at a time that is s unit time before the time of interest is plotted. In the example of FIG. 21, black circles are plots relating to the first measurement data, and black triangles are plots relating to the second measurement data. Note that the plots of the first measurement data and the plots of the second measurement data are not limited to the black circle and the black triangle, and the plots of the first measurement data and the plots of the second measurement data may be displayed in any display mode as long as the plots of the first measurement data and the plots of the second measurement data are displayed in different display modes and can be distinguished from each other.

A region 2101 indicates that the measurement value at the time of interest of the measurement data and the measurement value before the s unit time are close to each other, and indicates a steady state. In other words, the value obtained by differentiating the measured value in the time direction in the differential step s is close to zero, indicating a steady state in which the time derivative is close to zero, that is, no drift of the time derivative occurs.

On the other hand, in a region 2102, it is indicated that the measured value at the time of interest of the measurement data is larger than the measured value before the s unit time, and it is indicated that the measured value is in a transient state of increasing with time. In other words, it represents a transient state in which the value obtained by differentiating the measured value in the time direction in the differential step s is positive and the time derivative is positive.

Further, in an area 2103, it is indicated that the measured value at the time of interest of the measurement data is smaller than the measured value before the s unit time, and it is indicated that the measured value is in a transient state of decreasing with time. In other words, it represents a transient state in which the value obtained by differentiating the measured value in the time direction in the differential step s is negative and the time derivative is negative. By referring to the scatter diagram illustrated in FIG. 21, it can be grasped from the scatter diagram that the drift of the time derivative occurs.

Figure 22:
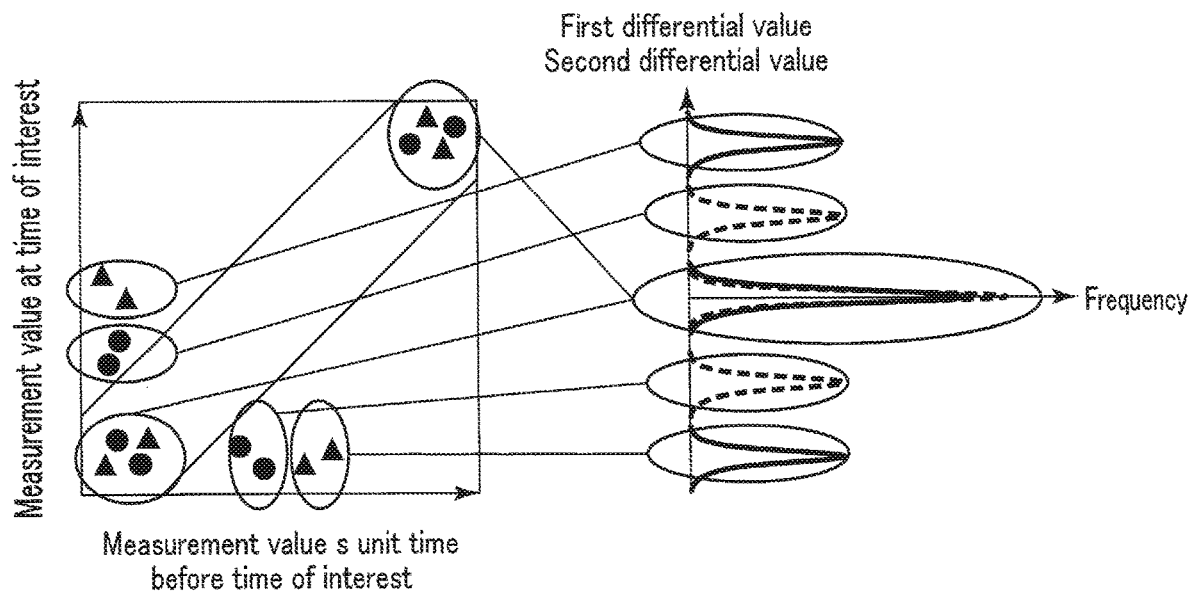
FIG. 22 is a diagram illustrating a second display example of the scatter diagram data according to the seventh embodiment.

Next, a second display example of scatter diagram data according to the seventh embodiment is illustrated in FIG. 22.

FIG. 22 is an example in which the scatter diagram illustrated in FIG. 21 and the differential value distribution illustrated in FIG. 5 are displayed side by side.

A correspondence relationship is illustrated so as to connect corresponding data groups between the plot of the scatter diagram and the histogram of the differential value distribution.

Note that in FIGS. 21 and 22, a vertical axis and a horizontal axis of the scatter diagram may be interchanged. Further, the horizontal axes of the scatter diagrams in FIGS. 21 and 22 indicate the measurement value corresponding to the time that is s unit time before the time of interest, but the measurement value corresponding to the time that is s unit time after the time of interest may be used.

According to the seventh embodiment described above, the user can grasp the drift of the time derivative from both the scatter diagram and the histogram.

Eighth Embodiment

In an eighth embodiment, a case where values of one or more sensors installed in a system are monitored by a machine learning model will be described.

If the first period is a period of training data of the machine learning model, and the second period is a period after the first period, a data processing apparatus 100 can monitor the number of sensors in which the drift of the time derivative is detected among the one or more sensors to be monitored in the period of the training data and the period after the period of the training data.

Further, by shifting the second period in the latest time direction and acquiring the second measurement data in a second acquisition unit 104, it is also possible to monitor a change in the number of sensors in which the drift regarding the time derivative is detected.

Figure 23:
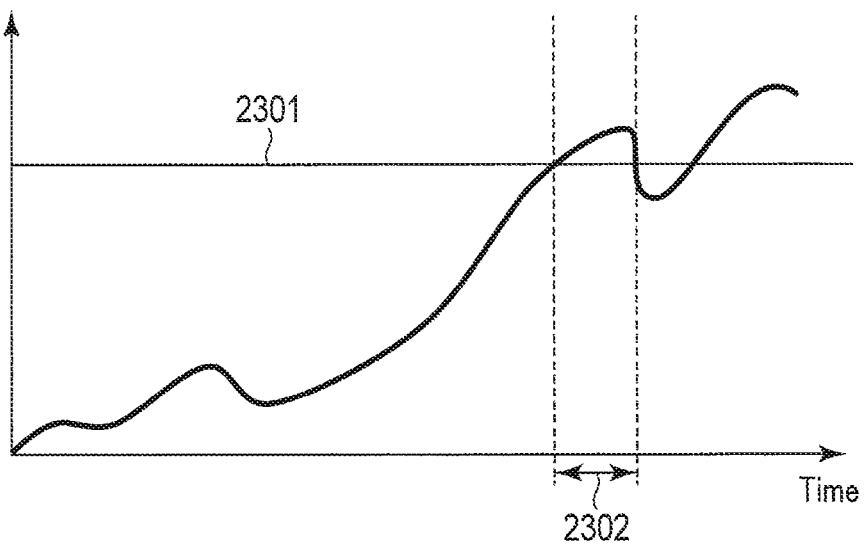
FIG. 23 is a diagram illustrating an example of a graph showing a change in the number of sensors in which a drift in a time derivative is detected.

Here, an example of a graph representing a change in the number of sensors in which the drift of the time derivative is detected is illustrated in FIG. 23.

In the graph illustrated in FIG. 23, a horizontal axis represents time, and a vertical axis represents the number of sensors in which the drift of the time derivative is detected. A drift information output unit 1402 may generate, as the drift information, information regarding the time series change in the number of sensors in which the drift of the time derivative is detected, and output the information as a graph illustrated in FIG. 23 or as a list.

Further, a threshold value 2301 of the predetermined number of sensors is set, and in a case where the number of sensors is larger than or equal to the threshold value 2301 in the time series change in the number of sensors, the drift information output unit 1402 may output information prompting update of the machine learning model. This is because the generated machine learning model can be determined to be a model not suitable for the current sensor value in a case where the number of sensors in which the drift of the time derivative occurs is larger than or equal to the threshold value.

That is, the user can determine to update the trained model when the number of sensors in which the drift regarding the time derivative is detected exceeds the predetermined value.

Note that, if the period during which the number of sensors in which the drift has occurred exceeds the threshold value 2301 is less than a predetermined period, it may be determined that the trained model is not updated. For example, if the period during which the number of sensors in which the drift has occurred exceeds the threshold value 2301 is less than a predetermined period 2302, it is conceivable that the sensor value has temporarily fluctuated due to a defect of a product or the like. Therefore, the drift information output unit 1402 may not output information prompting update of the trained model.

According to the eighth embodiment described above, it is possible to determine the necessity of updating the trained model in a case where the trained model based on the values of the plurality of sensors is designed by detecting whether or not the drift of the time derivative occurs for the plurality of sensors.

Ninth Embodiment

In a ninth embodiment, for example, a prediction value regarding a measurement value of a sensor is calculated using a machine learning model.

A data processing apparatus 100 according to the ninth embodiment will be described with reference to a block diagram of FIG. 24.

As compared with FIG. 1, the data processing apparatus 100 according to the ninth embodiment illustrated in FIG. 24 further includes a third acquisition unit 2401, a model acquisition unit 2402, a predicted value generation unit 2403, and a third output unit 2404.

The third acquisition unit 2401 acquires time series data including measurement values at a plurality of times of one or more sensors installed in a system.

The model acquisition unit 2402 acquires a machine learning model trained with training data whose data period is the first period. The machine learning model is, for example, a model or a regression model of a neural network including an auto encoder model. Machine learning models for monitoring a system often determine periods of training data excluding periods of anomaly state by the system. In a case where the period of the training data does not include a period in which the system is anomaly, when time series data including measurement values of a plurality of times of the one or more sensors when the system is in a normal state is input to the machine learning model, a value close to the measurement value of the time of interest of the one or more sensors when the system is in a normal state is output from the trained model as a predicted value.

Further, when time series data including measurement values of one or more sensors at a plurality of times when the system is in an anomaly state is input to the machine learning model, it is expected that a value substantially different from a measurement value of a time of interest of one or more sensors when the system is in an anomaly state is output as a predicted value from the trained model.

The predicted value generation unit 2403 receives time series data from the third acquisition unit 2401 and a machine learning model from the model acquisition unit 2402. The predicted value generation unit 2403 generates a predicted value of the one or more sensors installed in the system by inputting the time series data to the machine learning model.

The third output unit 2404 outputs third output information related to the predicted value and the measurement value to the outside. The third output information is, for example, information indicating a trend graph of the measurement value and the predicted value regarding the one or more sensors.

Next, a display example regarding the third output information according to the ninth embodiment will be described with reference to FIGS. 25 and 26.

FIG. 25 is an example of a trend graph of the measurement value and the predicted value for a certain sensor of interest. In the graph illustrated in FIG. 25, a horizontal axis represents time and a vertical axis represents a value. A dashed line indicates a predicted value 2501 and a solid line indicates a measurement value 2502.

FIG. 26 is an example of a graph in which the period of the training data and the trend graph of a period C in FIG. 25 are displayed in a superimposed manner for the measurement value of the sensor of interest. A horizontal axis represents relative time, and a vertical axis represents a value. A dashed line indicates a measurement value 2601 for the period of the training data, i.e., the first period, and a solid line indicates a measurement value 2602 for the period C.

Referring to FIGS. 25 and 26, it can be seen that the sensor of interest takes a value around a value "A" or "B" in the steady state, and takes a value between the value "A" and the value "B" in the transient state. From FIG. 26, it can be seen that the time derivative of the measurement value in the transient state is faster in the period C than in the period of the training data, that is, the first period. Since the machine learning model has trained that the time derivative of the measurement value of the sensor of interest is similar to that of the training data, the time derivative of the predicted value of the period C tends to be similar to that of the training data. Therefore, a curve of the predicted value 2501 in the period C illustrated in FIG. 25 has a shape delayed as compared with a curve of the measurement value 2502. In a case where an absolute value of the difference between the predicted value 2501 and the measurement value 2502 is larger than the threshold value, it is considered that the anomaly is easily detected in the transient state when the anomaly is detected as the anomaly (or the anomaly candidate).

Note that the sensor of interest may be displayed via a GUI that can be switched to a measurement value of another sensor.

By displaying FIG. 25 together with FIGS. 3 and 4 or by displaying FIG. 25 together with FIG. 5, it can be easily grasped that the reason why the time derivative of the measurement value 2502 is faster than the predicted value 2501 is the drift of the time derivative. If the drift in the time derivative is not anomaly, the user can be aware that the deviation between the predicted value 2501 and the measurement value 2502 in the transient state is a false detection and the system is not anomaly.

According to the ninth embodiment described above, for example, by displaying the first and second differential value distributions in addition to the trend graph comparing the measurement value and the predicted value in the first period, the user can grasp that the deviation of the transient state of the trend graph is caused by the drift of the time derivative. As a result, since the user can notice the cause without stopping the system and investigating the cause, it is possible to avoid a loss of cost and time due to the system stop.

Tenth Embodiment

In a tenth embodiment, for example, a predicted value regarding a measurement value of a sensor is calculated using a machine learning model.

A data processing apparatus 100 according to the tenth embodiment will be described with reference to a block diagram of FIG. 27.

Figure 27:
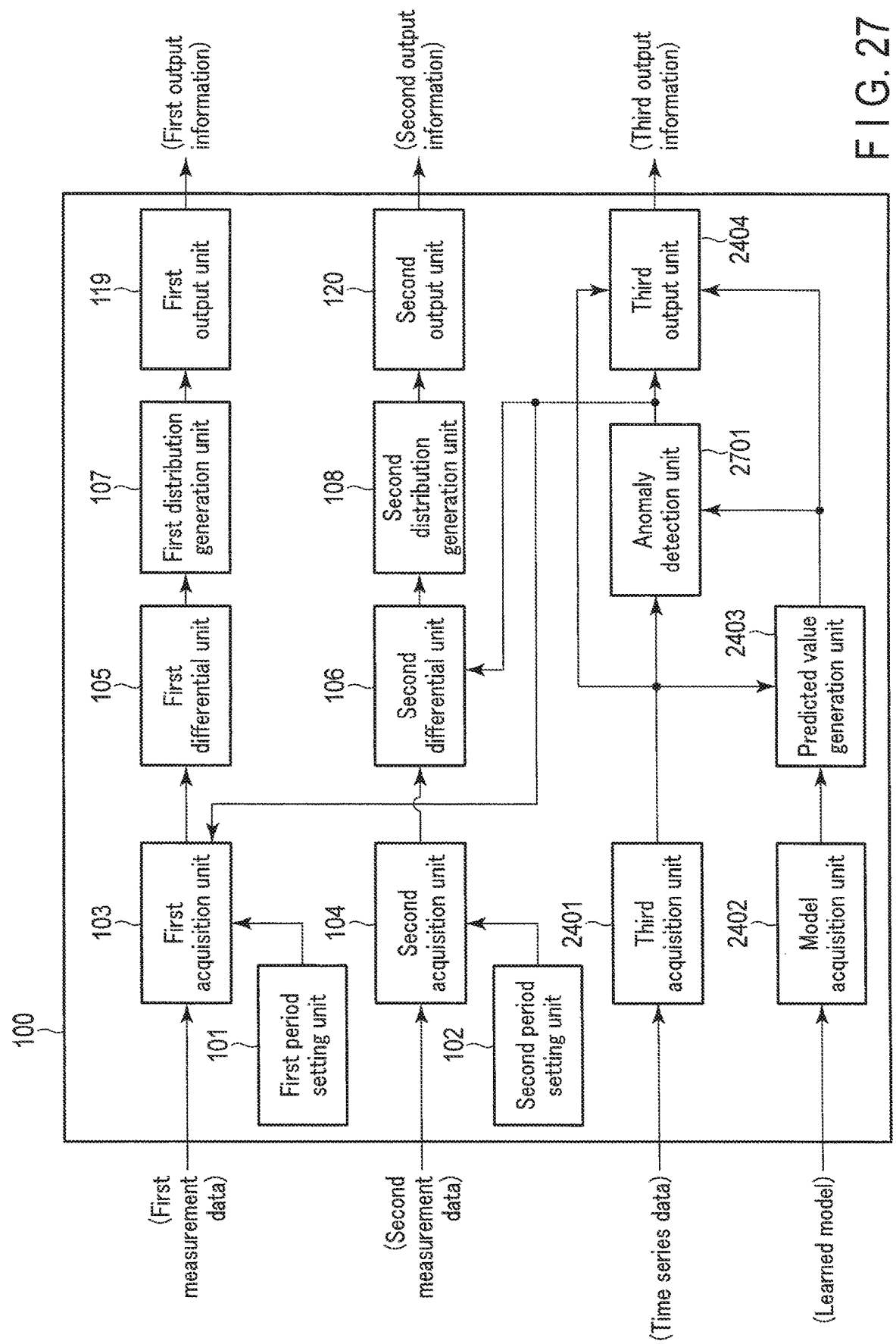
FIG. 27 is a block diagram illustrating a data processing apparatus according to a tenth embodiment.

The data processing apparatus 100 according to the tenth embodiment illustrated in FIG. 27 further includes an anomaly detection unit 2701 as compared with FIG. 24.

The anomaly detection unit 2701 receives the time series data of the sensor of interest from a third acquisition unit 2401 and the predicted value from a predicted value generation unit 2403, and generates a detection signal that detects whether or not an absolute value of a difference between the predicted value and the measurement value at each time is larger than a threshold value. When an absolute value of the difference is larger than the threshold value, it is determined that there is an anomaly or an anomaly candidate. The detection signal is transmitted to a first acquisition unit 103, a second acquisition unit 104, and the third acquisition unit 2401.

Next, a display example of the detection signal according to the tenth embodiment is illustrated in FIG. 28.

In a graph illustrated in FIG. 28, a horizontal axis represents time and a vertical axis represents a value of the detection signal. For example, when a value of the detection signal is zero, it indicates that it has not been detected as an anomaly or an anomaly candidate, and when the value is not zero, it indicates that it has been detected as an anomaly or an anomaly candidate.

Here, the first acquisition unit 103 and the second acquisition unit 104 may receive an anomaly signal from the anomaly detection unit 2701, identify a sensor detected to be anomaly or an anomaly candidate, and set the sensor as a sensor of interest that acquires the first measurement data and the second measurement data.

Note that by matching the period of the training data of the machine learning model acquired by a model acquisition unit 2402 with the first period, the first output information can correspond to the period of the training data of the machine learning model. Similarly, by matching the period in which the predicted value is generated by a predicted value generation unit 2403 with the second period, the second output information can correspond to the period in which the predicted value is generated. Note that, in a case where the period for generating the predicted value of the sensor of interest is the second period, the second period is a period of the training data, that is, a period after the first period in the time direction.

According to the tenth embodiment described above, an anomaly or an anomaly candidate is detected by comparing the measurement value of the sensor of interest with the predicted value of the machine learning model, and the measurement value of the sensor is made to correspond to the first period corresponding to the period of the training data and the second period corresponding to the period in which the predicted value is generated. This makes it easier for the user to grasp, from the first and second differential value distributions, whether or not the time derivative of the measurement value of the sensor in which the anomaly or the anomaly candidate is detected has drifted between the period of the training data and the period in which the predicted value is generated.

Here, an example of a hardware configuration of the data processing apparatus 100 according to the above-described embodiments is illustrated in a block diagram of FIG. 29.

The data processing apparatus 100 includes a central processing unit (CPU) 2901, a random access memory (RAM) 2902, a read only memory (ROM) 2903, a storage 2904, a display device 2905, an input device 2906, and a communication device 2907, which are each connected by a bus.

The CPU 2901 is a processor that executes arithmetic processing, control processing, and the like according to a program. The CPU 2901 uses a predetermined area of the RAM 2902 as a work area, and executes processing of each unit of the data processing apparatus 100 described above in cooperation with programs stored in the ROM 2903, the storage 2904, and the like.

The RAM 2902 is a memory such as a synchronous dynamic random access memory (SDRAM). The RAM 2902 functions as a work area of the CPU 2901. The ROM 2903 is a memory that stores programs and various types of information in a non-rewritable manner.

The storage 2904 is an apparatus that writes and reads data in and from a magnetic recording medium such as a hard disc drive (HDD), a semiconductor storage medium such as a flash memory, an optically recordable storage medium, or the like. The storage 2904 writes and reads data to and from the storage medium under the control of the CPU 2901.

The display device 2905 is a display device such as a liquid crystal display (LCD). The display device 2905 displays various types of information based on a display signal from the CPU 2901.

The input device 2906 is an input device such as a mouse and a keyboard. The input device 2906 receives information input by operation from the user as an instruction signal, and outputs the instruction signal to the CPU 2901.

The communication device 2907 communicates with an external device via a network in accordance with the control from the CPU 2901.

The instruction illustrated in the processing procedure illustrated in the above-described embodiments can be executed based on a program that is software. By storing this program in advance and reading this program, a general-purpose computer system can obtain an effect similar to the effect of the control operation of the data processing apparatus described above. The instructions described in the above-described embodiments are recorded in a magnetic disk (flexible disk, hard disk, etc.), an optical disk (CD-ROM, CD-R, CD-RW, DVD-ROM, DVD±R, DVD±RW, Blu-ray (registered trademark) Disc, and the like), a semiconductor memory, or a recording medium similar thereto as a program that can be executed by a computer. A storage format may be any form as long as it is a recording medium readable by a computer or an embedded system. When the computer reads a program from the recording medium and causes the CPU to execute instructions described in the program based on the program, it is possible to realize an operation similar to the control of the data processing apparatus of the above-described embodiment. Of course, when the computer acquires or reads the program, the program may be acquired or read through a network.

Further, an operating system (OS) running on a computer, database management software, middleware (MW) such as a network, or the like based on an instruction of a program installed from a recording medium to the computer or an embedded system may execute a part of each processing for realizing the present embodiments.

Furthermore, the recording medium in the present embodiments is not limited to a medium independent of a computer or an embedded system, and includes a recording medium that downloads and stores or temporarily stores a program transmitted via a LAN, the Internet, or the like.

Further, the number of recording media is not limited to one, and a case where the processing in the present embodiments is executed from a plurality of media is also included in the recording media in the present embodiments, and the configuration of the media may be any configuration.

Note that the computer or the embedded system in the present embodiments is for executing each processing in the present embodiments based on a program stored in a recording medium, and may have any configuration such as an apparatus including one such as a personal computer or a microcomputer, or a system in which a plurality of apparatuses are connected to a network.

Further, the computer in the present embodiments is not limited to a personal computer, and includes an arithmetic processing apparatus, a microcomputer, and the like included in an information processing device, and collectively refers to a device and an apparatus capable of realizing a function in the present embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus for detecting a drift regarding a time derivative, the apparatus comprising a processor configured to:
   acquire first measurement data that is a set of measurement values in a first period among time series data of measurement values of a sensor of interest among a plurality of sensors included in a system;
   acquire second measurement data that is a set of measurement values in a second period different from the first period among the time series data of the measurement values of the sensor of interest;
   calculate, from the first measurement data, a first differential value in a time direction at a first time included in the first period of the measurement values of the sensor of interest, wherein the first differential value represents a time derivative in the first period of the measurement values of the sensor of interest, wherein the processor calculates a first differential value set that is a set of first differential values calculated by changing the first time in the first period;
   calculate, from the second measurement data, a second differential value in a time direction at a second time included in the second period of the measurement values of the sensor of interest, wherein the second differential value represents a time derivative in the second period of the measurement values of the sensor of interest, wherein the processor calculates a second differential value set that is a set of second differential values calculated by changing the second time in the second period;
   generate a first differential value distribution using the first differential value set;
   generate a second differential value distribution using the second differential value set;
   detect whether a drift of the time derivative of the measurement value of the sensor of interest has occurred between the first period and the second period based on the generated first differential value distribution and the generated second differential value distribution, and generate a drift detection signal indicating whether the drift of the time derivative has been detected; and
   output the first differential value distribution, the second differential value distribution, and drift information regarding detection of the drift of the time derivative based on the generated drift detection signal,
   wherein the measurement values of the plurality of sensors are monitored by a machine learning model to detect an anomaly in the measurement values,
   wherein the machine learning model is trained by training data in which a data period is the first period, and the second period is a period after the first period;
   wherein the processor executes processing of detecting a drift of the time derivative for each of measurement values of a plurality of the sensors of interest,
   wherein the processor detects whether a number of sensors for which the drift of the time derivative is detected is larger than or equal to a threshold value;
   wherein the processor generates and outputs the drift information to include information prompting update of the machine learning model when it is detected that the number of sensors for which the drift of the time derivative is detected is larger than or equal to a threshold value.

2. The apparatus according to claim 1, wherein the processor calculates each of the first differential values by calculating a difference between a measurement value at a first attention time in the first period and a measurement value at a first calculation target time separated from the first attention time by a predetermined time, and
   calculates each of the second differential values by calculating a difference between a measurement value at a second attention time in the second period and a measurement value at a second calculation target time separated from the second attention time by the predetermined time.

3. The apparatus according to claim 2, wherein the predetermined time is shorter than a time window length of part of time series data to be input to the machine learning model applied to the time series data to detect whether an anomaly has occurred.

4. The apparatus according to claim 2, wherein the predetermined time is a time obtained by subtracting one unit time from a time corresponding to a time window length of part of time series data to be an input to the machine learning model applied to the time series data of measurement values of the sensor of interest.

5. The apparatus according to claim 2, wherein the predetermined time is a time set by a user instruction.

6. The apparatus according to claim 1, wherein the processor displays at least one of a first trend graph indicating a temporal transition of each of the first differential values in the first period and a second trend graph indicating a temporal transition of each of the second differential values in the second period.

7. The apparatus according to claim 1, wherein the processor is further configured to calculate a score that is similarity or dissimilarity between the first differential value distribution and the second differential value distribution.

8. The apparatus according to claim 7, wherein the processor is further configured to perform detection by regarding that the drift of the time derivative of the measurement value of the sensor of interest has occurred between the first period and the second period in a case where the score is less than a threshold when the score represents the similarity, and in a case where the score is greater than the threshold when the score represents the dissimilarity.

9. The apparatus according to claim 8, wherein the processor outputs list information of one or more sensors in which the drift of the time derivative is detected.

10. The apparatus according to claim 8, wherein the processor outputs at least one of information regarding a number of sensors in which the drift of the time derivative is detected and information regarding a temporal change in the number of sensors.

11. The apparatus according to claim 1, wherein the processor outputs information regarding at least one of a maximum value, a minimum value, an average value, and a median value of the measurement values in the first period and/or at least one of a maximum value, a minimum value, an average value, and a median value of the measurement values in the second period.

12. The apparatus according to claim 1, wherein the processor further configured to create a scatter diagram in which the first measurement data is plotted in a first display mode and the second measurement data is plotted in a second display mode different from the first display mode in a two-dimensional area, the two dimensional area including a first axis representing time of interest and a second axis representing time that is a predetermined time away from the time of interest, and
outputs the scatter diagram.

13. The apparatus according to claim 1, wherein the processor is further configured to:
acquire each piece of time series data of measurement values from one or more sensors;
acquire the machine learning model trained by training data in which a data period is the first period;
input the each piece of time series data into the trained machine learning model, and generate a predicted value; and
output information regarding a trend graph of the measurement values and the predicted value.

14. The apparatus according to claim 13, wherein the processor is further configured to determine that there is an anomaly in the sensor that has output the measurement values when a difference between each of the measurement values and the predicted value is larger than or equal to a threshold,
wherein the sensor of interest is a sensor that is determined to have an anomaly among the one or more sensors.

15. The apparatus according to claim 1, wherein the first period is a period corresponding to training data for generating the machine learning model to be applied to the time series data.

16. A data processing method executed by a processor for detecting a drift regarding a time derivative, the method comprising:
acquiring first measurement data that is a set of measurement values in a first period among time series data of measurement values of a sensor of interest among a plurality of sensors included in a system;
acquiring second measurement data that is a set of measurement values in a second period different from the first period among the time series data of the measurement values of the sensor of interest;
calculating, from the first measurement data, a first differential value in a time direction at a first time included in the first period of the measurement values of the sensor of interest, wherein the first differential value represents a time derivative in the first period of the measurement values of the sensor of interest, wherein the processor calculates a first differential value set that is a set of first differential values calculated by changing the first time in the first period;
calculating, from the second measurement data, a second differential value in a time direction at a second time included in the second period of the measurement values of the sensor of interest, wherein the second differential value represents a time derivative in the second period of the measurement values of the sensor of interest, wherein the processor calculates a second differential value set that is a set of second differential values calculated by changing the second time in the second period;
generating a first differential value distribution using the first differential value set;
generating a second differential value distribution using the second differential value set;
detecting whether a drift of the time derivative of the measurement value of the sensor of interest has occurred between the first period and the second period based on the generated first differential value distribution and the generated second differential value distribution, and generate a drift detection signal indicating whether the drift of the time derivative has been detected; and
outputting the first differential value distribution, the second differential value distribution, and drift information regarding detection of the drift of the time derivative based on the generated drift detection signal,
wherein the measurement values of the plurality of sensors are monitored by a machine learning model to detect an anomaly in the measurement values,
wherein the machine learning model is trained by training data in which a data period is the first period, and the second period is a period after the first period;
wherein the method further comprises:
executing processing of detecting a drift of the time derivative for each of measurement values of a plurality of the sensors of interest;
detecting whether a number of sensors for which the drift of the time derivative is detected is larger than or equal to a threshold value; and
generating and outputting the drift information to include information prompting update of the machine learning model when it is detected that the number of sensors for which the drift of the time derivative is detected is larger than or equal to a threshold value.

17. A non-transitory computer readable medium including computer executable instructions, wherein the instructions, when executed by a processor, cause the processor to perform a method comprising:

acquiring first measurement data that is a set of measurement values in a first period among time series data of measurement values of a sensor of interest among a plurality of sensors included in a system;

acquiring second measurement data that is a set of measurement values in a second period different from the first period among the time series data of the measurement values of the sensor of interest;

calculating, from the first measurement data, a first differential value in a time direction at a first time included in the first period of the measurement values of the sensor of interest, wherein the first differential value represents a time derivative in the first period of the measurement values of the sensor of interest, wherein the processor calculates a first differential value set that is a set of first differential values calculated by changing the first time in the first period;

calculating, from the second measurement data, a second differential value in a time direction at a second time included in the second period of the measurement values of the sensor of interest, wherein the second differential value represents a time derivative in the second period of the measurement values of the sensor of interest, wherein the processor calculates a second differential value set that is a set of second differential values calculated by changing the second time in the second period;

generating a first differential value distribution using the first differential value set;

generating a second differential value distribution using the second differential value set; detecting whether a drift of the time derivative of the measurement value of the sensor of interest has occurred between the first period and the second period based on the generated first differential value distribution and the generated second differential value distribution, and generate a drift detection signal indicating whether the drift of the time derivative has been detected; and outputting the first differential value distribution, the second differential value distribution, and drift information regarding detection of the drift of the time derivative based on the generated drift detection signal, wherein the measurement values of the plurality of sensors are monitored by a machine learning model to detect an anomaly in the measurement values, wherein the machine learning model is trained by training data in which a data period is the first period, and the second period is a period after the first period;

wherein the method further comprises:

executing processing of detecting a drift of the time derivative for each of measurement values of a plurality of the sensors of interest;

detecting whether a number of sensors for which the drift of the time derivative is detected is larger than or equal to a threshold value; and generating and outputting the drift information to include information prompting update of the machine learning model when it is detected that the number of sensors for which the drift of the time derivative is detected is larger than or equal to a threshold value.

* * * * *